United States Patent
Tanaka et al.

(10) Patent No.: US 9,178,571 B2
(45) Date of Patent: Nov. 3, 2015

(54) COMMUNICATION APPARATUS, COMMUNICATION METHOD, COMMUNICATION PROGRAM, SERVER APPARATUS, INFORMATION UPDATING METHOD FOR SERVER APPARATUS, AND COMMUNICATION SYSTEM

(71) Applicant: Panasonic Intellectual Property Corporation of America, Torrance, CA (US)

(72) Inventors: Toshiaki Tanaka, Hyogo (JP); Mariko Nakaso, Shiga (JP); Masaru Yamaoka, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 176 days.

(21) Appl. No.: 14/009,408

(22) PCT Filed: Feb. 13, 2013

(86) PCT No.: PCT/JP2013/000772
§ 371 (c)(1),
(2) Date: Oct. 2, 2013

(87) PCT Pub. No.: WO2013/128816
PCT Pub. Date: Sep. 6, 2013

(65) Prior Publication Data
US 2014/0065959 A1    Mar. 6, 2014

(30) Foreign Application Priority Data
Feb. 28, 2012  (JP) .................................. 2012-042147

(51) Int. Cl.
*G01S 3/02* (2006.01)
*H04B 5/00* (2006.01)
(Continued)

(52) U.S. Cl.
CPC .............. *H04B 5/0062* (2013.01); *G06T 7/004* (2013.01); *H04B 5/0043* (2013.01); *H04M 1/7253* (2013.01); *H04M 2250/04* (2013.01); *H04M 2250/52* (2013.01)

(58) Field of Classification Search
CPC ............... H04B 5/0062; H04B 5/0043; H04B 7/18556; G01S 1/047; G01S 3/02; G01S 3/046; G06T 7/004
See application file for complete search history.

(56) References Cited

U.S. PATENT DOCUMENTS

2008/0093447 A1   4/2008  Johnson et al.
2010/0190537 A1   7/2010  Fujii
(Continued)

FOREIGN PATENT DOCUMENTS

CN   101517915   8/2009
CN   101990661   3/2011
(Continued)

OTHER PUBLICATIONS

International Search Report issued Mar. 19, 2013 in International (PCT) Application No. PCT/JP2013/000772.

*Primary Examiner* — Andrew Wendell
(74) *Attorney, Agent, or Firm* — Wenderoth, Lind & Ponack, L.L.P.

(57) ABSTRACT

A reference image acquisition unit (171) obtains a reference image for guiding a portable device (1) to a position in which near field wireless communication with a terminal device (2) is possible on the basis of portable device identification information for identifying a type of the portable device (1). A reference image display control unit (172) displays the reference image obtained by the reference image acquisition unit (171) on a display unit (12) provided on an opposite surface of the portable device (1) to a surface that opposes the terminal device (2) when the portable device (1) is brought close to the terminal device (2). A reference image correction unit (173) corrects a position of the reference image in response to an image moving operation for aligning the reference image displayed on the display unit (12) with a target mark formed on a front surface of the terminal device (2).

15 Claims, 26 Drawing Sheets

(51) Int. Cl.
*H04M 1/725* (2006.01)
*G06T 7/00* (2006.01)

(56) References Cited

U.S. PATENT DOCUMENTS

| | | |
|---|---|---|
| 2010/0283586 A1 | 11/2010 | Ikeda et al. |
| 2012/0208458 A1* | 8/2012 | Iwasaki et al. ............... 455/41.1 |
| 2012/0322374 A1* | 12/2012 | Yamaoka et al. ............ 455/41.1 |
| 2013/0059535 A1 | 3/2013 | Fujii |
| 2013/0116922 A1* | 5/2013 | Cai et al. ...................... 701/515 |
| 2013/0141567 A1* | 6/2013 | Walker et al. ................. 348/135 |
| 2013/0196591 A1 | 8/2013 | Ikeda et al. |
| 2014/0152856 A1 | 6/2014 | Ikeda et al. |

FOREIGN PATENT DOCUMENTS

| | | |
|---|---|---|
| JP | 2006-309665 | 11/2006 |
| JP | 2007-53424 | 3/2007 |
| JP | 2007-300579 | 11/2007 |
| JP | 2009-33590 | 2/2009 |
| JP | 2010-109594 | 5/2010 |
| JP | 2010-211577 | 9/2010 |

* cited by examiner

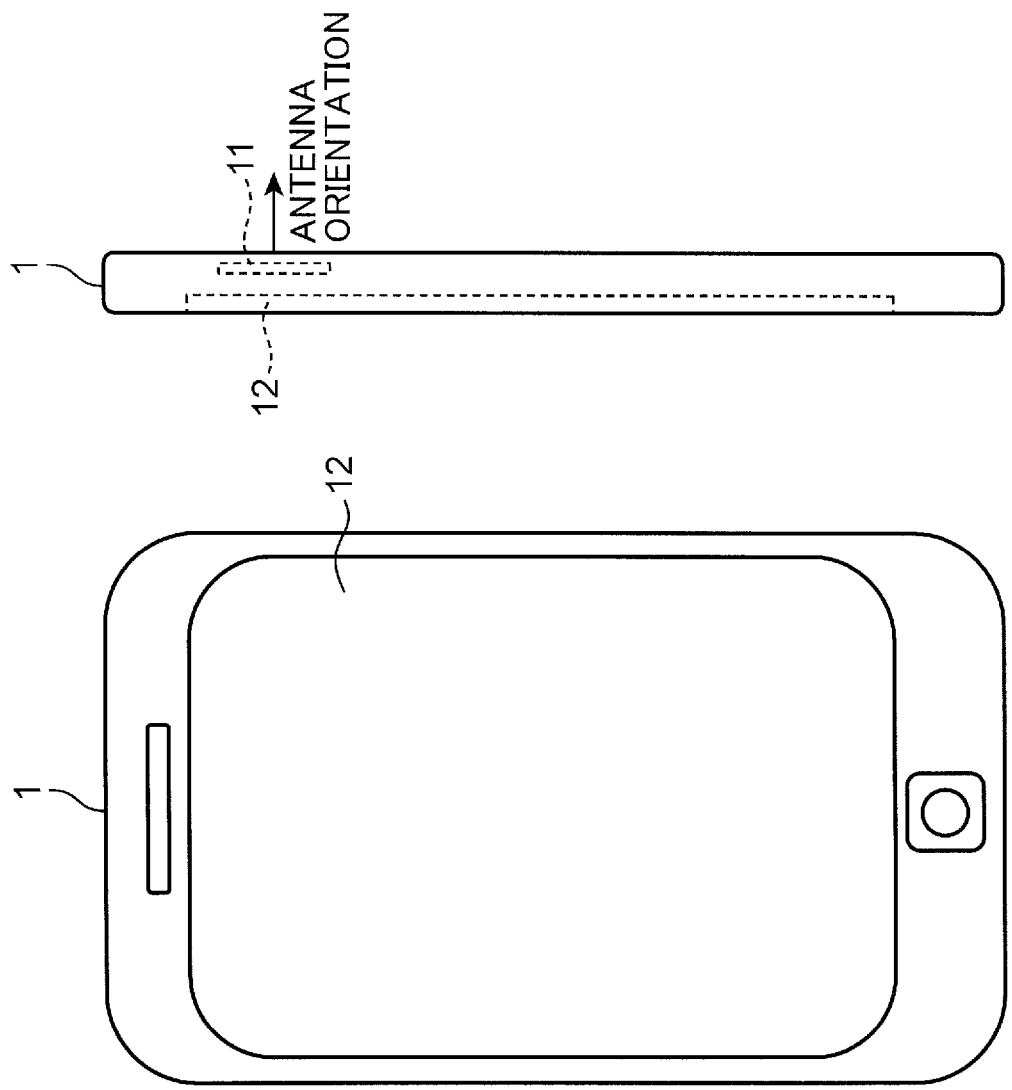
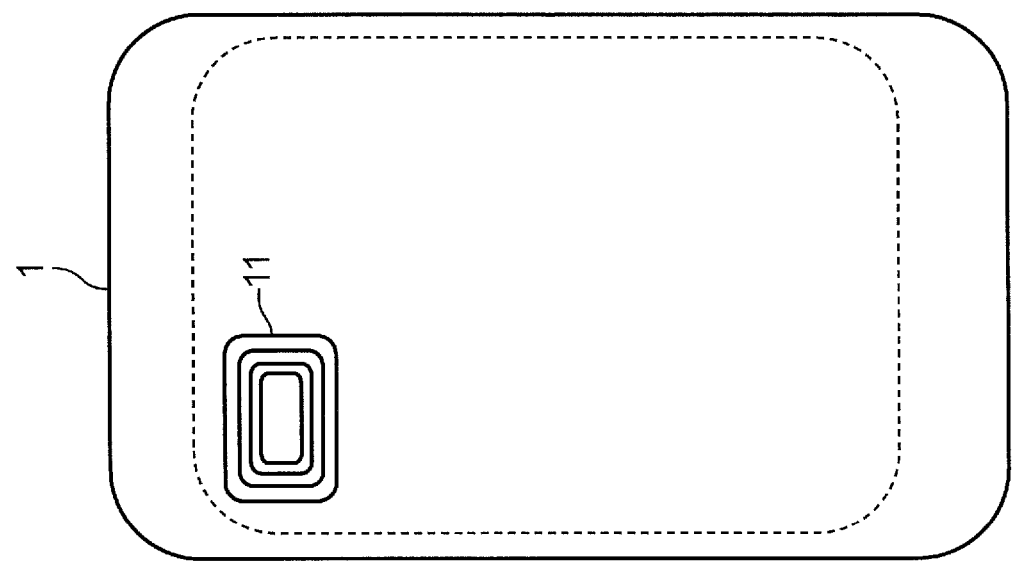
FIG. 2C
FIG. 2B
FIG. 2A

| PRODUCT NUMBER | REFERENCE IMAGE INFORMATION | |
| --- | --- | --- |
| | REFERENCE IMAGE | POSITION CORRECTION INFORMATION X(px),y(px) |
| UNSPECIFIED |  | x0, y0 |
| NA-XXX |  | x1,y1 |
| NR-XXX |  | x2,y2 |
| | | |

| PORTABLE DEVICE IDENTIFICATION INFORMATION | PRODUCT NUMBER | REFERENCE IMAGE INFORMATION | |
|---|---|---|---|
| | | REFERENCE IMAGE | POSITION CORRECTION INFORMATION X(px),y(px) |
| Pxxx | UNSPECIFIED | + | x10, y10 |
| | NA-XXX |  | x11,y11 |
| Sxxx | NR-XXX |  | x21,y21 |

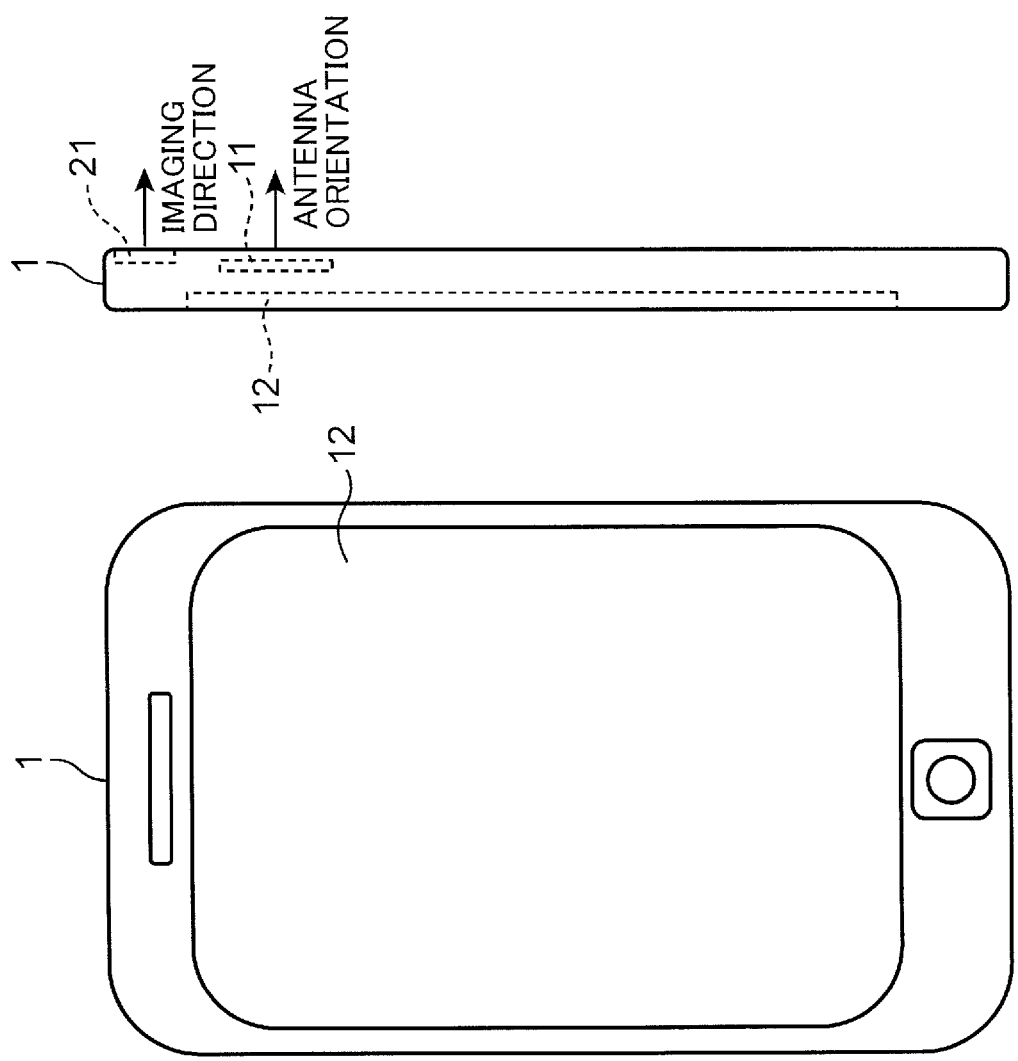
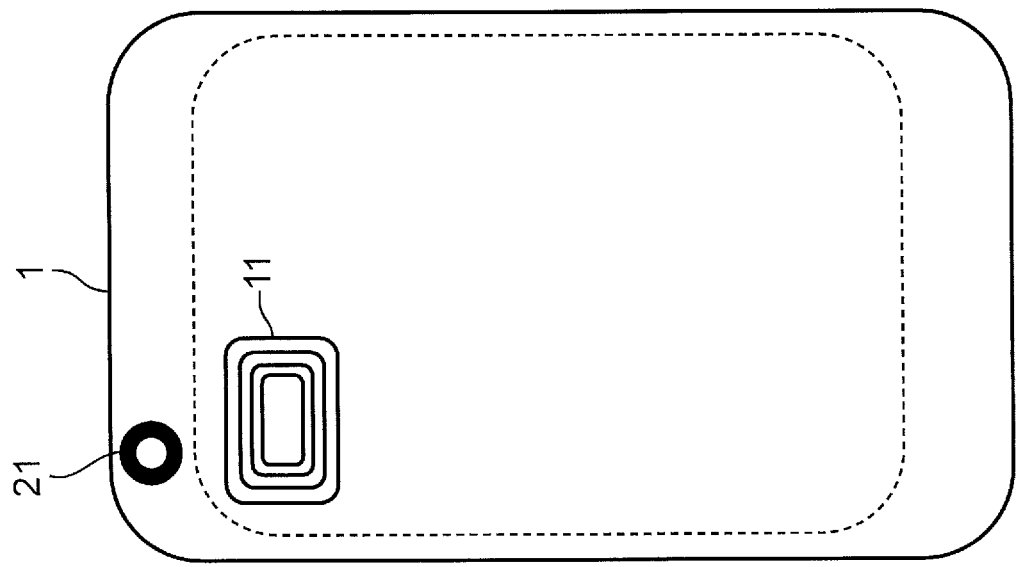
FIG. 28C
FIG. 28B
FIG. 28A

COMMUNICATION APPARATUS, COMMUNICATION METHOD, COMMUNICATION PROGRAM, SERVER APPARATUS, INFORMATION UPDATING METHOD FOR SERVER APPARATUS, AND COMMUNICATION SYSTEM

TECHNICAL FIELD

The present invention relates to a communication apparatus, a communication method, and a communication program for communicating with an external apparatus using near field wireless communication, a server apparatus connected via a network to the communication apparatus that communicates with the external apparatus using near field wireless communication, an information updating method for the server apparatus, and a communication system including the communication apparatus and the server apparatus.

BACKGROUND ART

A technique for performing near field wireless communication between devices using RFID (Radio Frequency Identification) or the like has been proposed in the related art. To perform near field wireless communication, respective antennas of two wireless communication devices that are to communicate must be brought close together so that a communication distance is short. A mark indicating a position of the antenna is provided on a surface of the wireless communication device on which the antenna is mounted. A user brings the respective marks on the two wireless communication devices close together in order to perform communication between the two wireless communication devices.

When the two wireless communication devices are brought close together, the mark indicating the position of the antenna is hidden behind the other wireless communication device. It is therefore difficult for the user to bring the antennas close together accurately in order to perform communication between the two wireless communication devices. In particular, when RFID is built into a portable telephone, an output of the antenna cannot be increased, and therefore the antennas must be positioned within several mm of each other, making it difficult to bring the antennas close together accurately.

To solve this problem, Patent Literature 1, for example, discloses a technique of displaying an auxiliary display indicating a position of a near field wireless communication antenna built into a case of a portable communication terminal on a display apparatus. Further, Patent Literature 2, for example, discloses a technique of providing an antenna on a front surface or a rear surface of a display unit of an information reading apparatus, displaying a guide figure indicating a target position on the display unit over which a user is to hold an IC card, and modifying the display position of the guide figure in accordance with a field intensity or a number of communication errors.

However, the position of an antenna built into a communication apparatus varies according to the type of communication apparatus, and therefore information indicating the position of the antenna must be stored in the communication apparatus itself. It is, however, extremely difficult to provide the information indicating the position of the antenna to every type of communication apparatus.

Individual differences also exist in the position of the antenna, and therefore the position of the antenna may vary even among communication apparatuses of the same type. Hence, when a predetermined assist mark is displayed on a display apparatus, as in Patent Literature 1, for example, the assist mark may not indicate the position of the antenna correctly.

Further, in Patent Literature 2, for example, the guide figure is displayed on the display unit of the information reading apparatus (a laptop personal computer) serving as a communication partner of a portable device, but Patent Literature 2 does not disclose displaying the guide figure on the portable device itself.

Moreover, providing a line or an icon indicating the position of the antenna on a household appliance serving as a communication partner may spoil the design of the household appliance.

CITATION LIST

Patent Literature

Patent Literature 1: Japanese Patent Application Publication No. 2009-33590
Patent Literature 2: Japanese Patent Application Publication No. 2010-211577

SUMMARY OF THE INVENTION

The present invention has been designed to solve the problems described above, and an object thereof is to provide a communication apparatus, a communication method, a communication program, a server apparatus, an information updating method for the server apparatus, and a communication system with which an antenna of the communication apparatus and an antenna of an external device can be positioned accurately.

A communication apparatus according to an aspect of the present invention communicates with an external apparatus using near field wireless communication, and includes: an antenna unit that transmits and receives radio waves required for the near field wireless communication; a display unit provided on an opposite surface to a surface that opposes the external apparatus when the communication apparatus is brought close to the external apparatus; a reference image acquisition unit that obtains a reference image for guiding the communication apparatus to a position in which the near field wireless communication with the external apparatus is possible on the basis of communication apparatus identification information for identifying a type of the communication apparatus; a reference image display control unit that displays the reference image obtained by the reference image acquisition unit on the display unit; and a reference image correction unit that corrects a position of the reference image in response to an image moving operation for aligning the reference image displayed on the display unit with a target mark formed on a front surface of the external apparatus.

According to this configuration, the antenna unit transmits and receives the radio waves required for near field wireless communication. The display unit is provided on the opposite surface to the surface that opposes the external apparatus when the communication apparatus is brought close to the external apparatus. The reference image acquisition unit obtains the reference image for guiding the communication apparatus to the position in which near field wireless communication with the external apparatus is possible on the basis of the communication apparatus identification information for identifying the type of the communication apparatus. The reference image display control unit displays the reference image obtained by the reference image acquisition unit on the display unit. The reference image correction unit corrects the position of the reference image in response to the image moving operation for aligning the reference image displayed on the display unit with the target mark formed on the front surface of the external apparatus.

According to the present invention, the reference image for guiding the communication apparatus to the position in which near field wireless communication with the external apparatus is possible is displayed, and the position of the reference image is corrected in response to the image moving operation for aligning the reference image displayed on the display unit with the target mark formed on the front surface of the external apparatus. As a result, an antenna of the communication apparatus and an antenna of an external device can be positioned accurately using the corrected reference image.

Objects, features, and advantages of the present invention will become more apparent from the following detailed description and the attached drawings.

BRIEF DESCRIPTION OF THE DRAWINGS

FIG. 1 is a view showing a configuration of a communication system according to a first embodiment of the present invention.

[FIG. 2] FIG. 2A is a view showing a rear surface of a portable device according to the first embodiment of the present invention, FIG. 2B is a view showing a front surface of the portable device according to the first embodiment of the present invention, and FIG. 2C is a view showing a side face of the portable device according to the first embodiment of the present invention.

FIG. 3 is a view showing an internal configuration of the portable device according to the first embodiment of the present invention.

FIG. 4 is a view showing an example of reference image information stored in a reference image storage unit.

FIG. 5 is a view showing an internal configuration of a server according to the first embodiment of the present invention.

[FIG. 61]

FIG. 7 is a first flowchart illustrating an operation of the communication system according to the first embodiment of the present invention.

FIG. 8 is a second flowchart illustrating the operation of the communication system according to the first embodiment of the present invention.

FIG. 9 is a third flowchart illustrating the operation of the communication system according to the first embodiment of the present invention.

FIG. 10 is a view showing an example of a terminal device selection screen displayed on a display unit.

FIG. 11 is a view showing a reference image displayed on the display unit of the portable device in step S13 of FIG. 8 when the reference image has not been corrected.

FIG. 12 is a view showing the portable device at a point where near field wireless communication with a terminal device 2 is established in step S18 of FIG. 8.

FIG. 13 is a view illustrating a reference image correction operation performed by a user in step S19 of FIG. 9.

FIG. 14 is a view showing the reference image displayed on the display unit of the portable device in step S13 of FIG. 8 when the reference image has already been corrected.

FIG. 15 is a view showing the reference image displayed on the display unit of the portable device when the portable device cannot obtain product number information of the terminal device and the reference image has not been corrected.

FIG. 16 is a view showing the portable device at the point where near field wireless communication with the terminal device 2 is established in a case where the portable device cannot obtain the product number information of the terminal device.

FIG. 17 is a view illustrating the reference image correction operation performed by the user when the portable device cannot obtain the product number information of the terminal device.

FIG. 18 is a view showing the reference image displayed on the display unit of the portable device when the portable device cannot obtain the product number information of the terminal device and the reference image has already been corrected.

FIG. 19 is a first flowchart illustrating an operation of the communication system according to a second modified example of the first embodiment of the present invention, performed when the portable device obtains the product number information from the terminal device.

FIG. 20 is a second flowchart illustrating the operation of the communication system according to the second modified example of the first embodiment of the present invention, performed when the portable device obtains the product number information from the terminal device.

FIG. 21 is a third flowchart illustrating the operation of the communication system according to the second modified example of the first embodiment of the present invention, performed when the portable device obtains the product number information from the terminal device.

FIG. 22 is a view showing a message displayed on a display unit 12 after a near field wireless communication unit 15 starts to transmit a polling signal in step S33 of FIG. 19.

FIG. 23 is a view showing the portable device at the point where a reference image is displayed in step S46 of FIG. 20.

FIG. 24 is a view illustrating the reference image correction operation performed by the user in step S47 of FIG. 20.

FIG. 25 is a view showing the reference image displayed on the display unit of the portable device in step S47 of FIG. 20 when the reference image has already been corrected.

FIG. 26 is a view showing an internal configuration of a portable device according to a second embodiment of the present invention.

FIG. 27 is a view showing an internal configuration of a portable device according to a third embodiment of the present invention.

[FIG. 28] FIG. 28A is a view showing a rear surface of the portable device according to the third embodiment of the present invention, FIG. 28B is a view showing a front surface of the portable device according to the third embodiment of the present invention, and FIG. 28C is a view showing a side face of the portable device according to the third embodiment of the present invention.

FIG. 29 is a view showing a terminal device and an example of an image displayed on the display unit of the portable device when the terminal device is imaged.

FIG. 30 is a view showing the portable device at the point where near field wireless communication with the terminal device is established.

FIG. 31 is a view illustrating the reference image correction operation performed by the user.

FIG. 32 is a view showing a configuration of a communication system according to a fourth embodiment of the present invention.

FIG. 33 is a view showing a configuration of a download server according to the fourth embodiment of the present invention.

DESCRIPTION OF EMBODIMENTS

Embodiments of the present invention will be described below with reference to the attached drawings. Note that the following embodiments are specific examples of the present invention, and are not intended to limit the technical scope of the present invention.

(First Embodiment)

Figure 1:
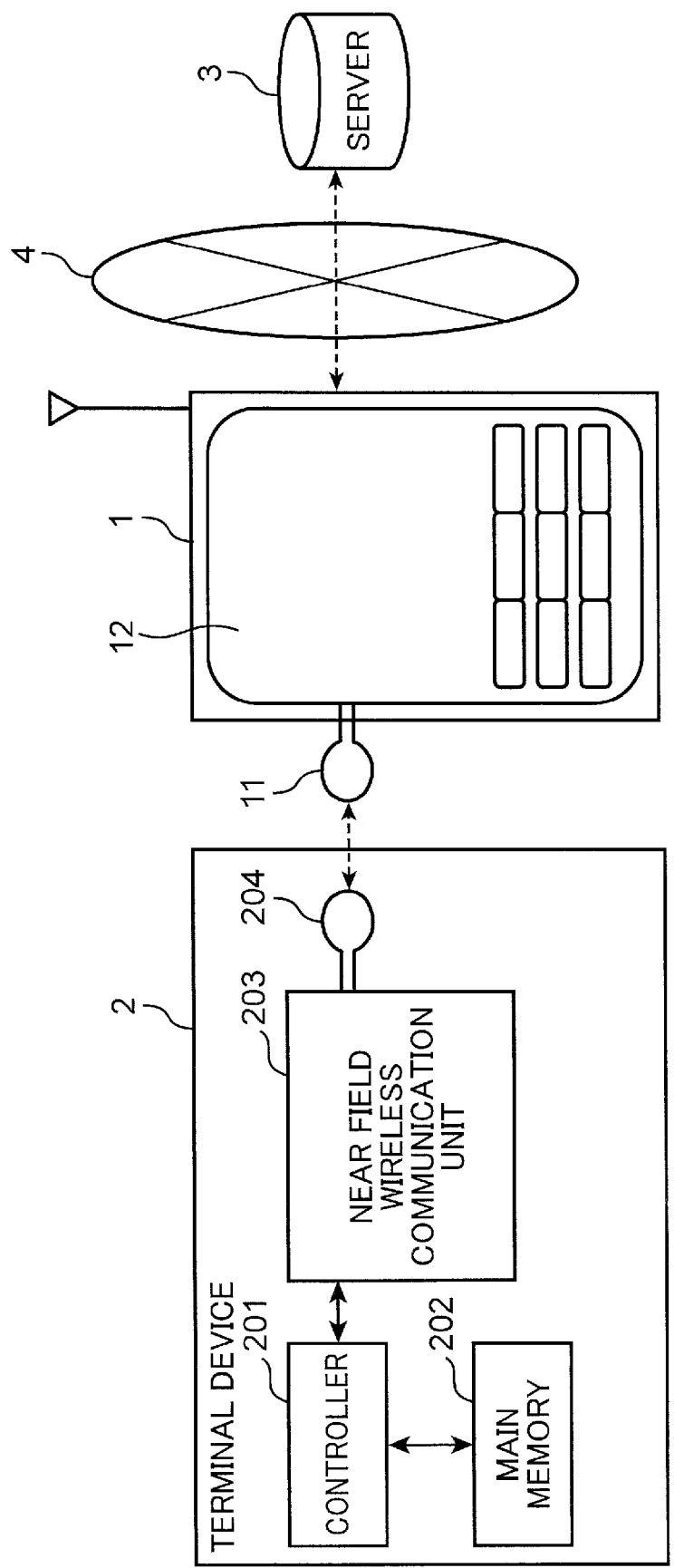
[FIG. 1]

FIG. 1 is a view showing a configuration of a communication system according to a first embodiment of the present invention. The communication system shown in FIG. 1 includes a portable device 1, a terminal device 2, and a server 3.

The portable device 1 is constituted by a communication apparatus such as a portable telephone, for example, which communicates with the terminal device 2 via a loop antenna 11 using near field wireless communication, and is connected communicably to the server 3 via a network 4. The portable device 1 may be any device having an NFC (Near Field Communication) reader/writer that can communicate with a passive/active RFID tag of the terminal device 2, but a transportable device is more preferable.

The terminal device 2 is constituted by a household appliance such as a television, a refrigerator, a washing machine, or a microwave oven, for example, which is connected communicably to the portable device 1 by near field wireless communication. Note that the terminal device 2 is not limited to a household appliance, and may also be an electrical appliance used inside or outside a household, such as a sensor that measures and detects housing equipment and living environments. The terminal device 2 may be any device that can communicate with an NFC reader/writer using a passive/active RFID tag. The terminal device 2 includes a controller 201, a main memory 202, a near field wireless communication unit 203, and a loop antenna 204.

Note that the portable device 1 may include the passive/active RFID tag instead of the NFC reader/writer, and the terminal device 2 may include the NFC reader/writer instead of the passive/active RFID tag. It is assumed in the following description that the portable device 1 includes the NFC reader/writer and the terminal device 2 includes the passive/active RFID tag.

The controller 201 is constituted by a CPU (Central Processing Unit) and so on in order to control an operation of the near field wireless communication unit 203 and control an operation of the main memory 202 in accordance with information and the like received via the near field wireless communication unit 203.

Terminal device identification information (product number information) for identifying the terminal device 2, for example a type number, a serial number, and so on of the terminal device 2, is stored in advance in the main memory 202 at the time of manufacture or the like. Internal information such as a use history and malfunction information of the terminal device 2 is also stored in the main memory 202. The main memory 202 preferably includes information from which a manufacturer of the terminal device can be specified, information from which a manufacture date can be specified, information from which a manufacturing process can be specified, and so on in order to register the terminal device in a database of the server. The main memory 202 also preferably includes server specification information (a URI (Uniform Resource Identifier), for example) for accessing different servers according to the manufacturer of the terminal device 2. Thus, the portable device 1 can access the server 3 easily. Furthermore, by holding a URI in the main memory 202 of the terminal device 2, the portable device 1 can access the unique server of the terminal device 2 regardless of the type of the terminal device 2.

The server 3 is not limited to a server that is unique to the manufacturer of the terminal device 2 or a server that is unique to the terminal device 2, and the server 3 may be specified by an application that is activated by the portable device 1 or by user selection.

The near field wireless communication unit 203 transmits and receives various information to and from the portable device 1 bi-directionally via the loop antenna 204 using a wireless system.

The loop antenna 204 is an antenna used to perform near field wireless communication. In this embodiment, HF (High Frequency) band RFID or NFC using a 13.56 MHz band is envisaged as the near field wireless communication, but the near field wireless communication is not limited to this frequency band. The frequency band of the near field wireless communication may be a UHF (Ultra High Frequency) band between 90 MHz and 1 GHz, or a frequency band exceeding 2 GHz.

FIG. 2 is a view showing an external configuration of the portable device according to the first embodiment of the present invention. FIG. 2A is a view showing a rear surface of the portable device according to the first embodiment of the present invention, FIG. 2B is a view showing a front surface of the portable device according to the first embodiment of the present invention, and FIG. 2C is a view showing a side face of the portable device according to the first embodiment of the present invention.

As shown in FIGS. 2A to 2C, the loop antenna 11 is built into the portable device 1. A display unit 12 is provided on the front surface of the portable device 1. The loop antenna 11 is oriented in a direction traveling from the front surface toward the rear surface, which is an opposite direction to a display direction of the display unit 12.

Figure 3:
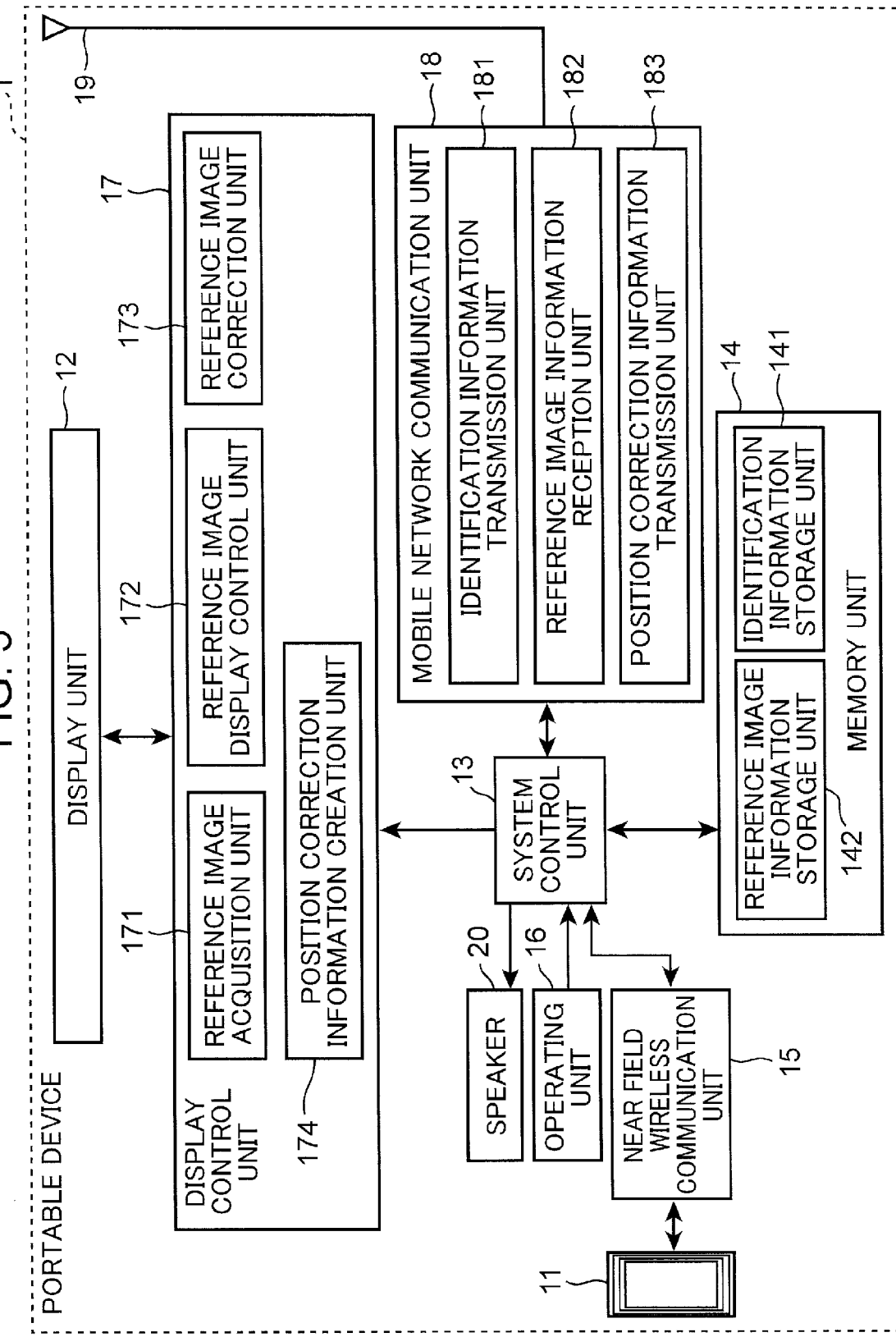
[FIG. 3]

FIG. 3 is a view showing an internal configuration of the portable device according to the first embodiment of the present invention. The portable device 1 shown in FIG. 3 includes the loop antenna 11, the display unit 12, a system control unit 13, a memory unit 14, a near field wireless communication unit 15, an operating unit 16, a display control unit 17, a mobile network communication unit 18, an antenna 19, and a speaker 20.

The loop antenna 11 is built into the portable device 1 in order to transmit and receive radio waves required for near field wireless communication. The loop antenna 11 is disposed in different positions according to the type of the portable device 1.

The display unit 12 is provided on an opposite surface to a surface that opposes the terminal device 2 when the portable device 1 is brought close to the terminal device 2, and displays various information. Note that the loop antenna 11 is preferably disposed within a display range of the display unit 12 (a range surrounded by the display unit 12 in FIG. 2C).

The system control unit 13 controls the entire portable device 1. The system control unit 13 controls the memory unit 14, the near field wireless communication unit 15, the display control unit 17, the mobile network communication unit 18, and the speaker 20 on the basis of operations input by the operating unit 16.

The memory unit 14 includes an identification information storage unit 141 and a reference image information storage unit 142. The identification information storage unit 141 stores portable device identification information for identifying the type of the portable device 1. The portable device identification information is a product number, a manufacturing number, or a serial number of the portable device 1, for example, which is stored in advance at the time of manufacture or the like. The reference image information storage unit 142 stores reference image information including a reference image for guiding the portable device 1 to a position in which near field wireless communication with the terminal device 2 is possible. The reference image information is obtained from the server 3 and stored in the reference image information storage unit 142. The reference image information also includes position correction information indicating a corrected position of the reference image.

Figure 4:
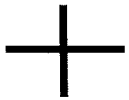
[FIG. 4]
Figure 4:
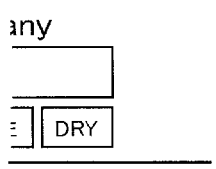
Figure 4:
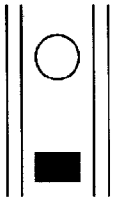

FIG. 4 is a view showing an example of the reference image information stored in the reference image storage unit.

As shown in FIG. 4, the reference image information storage unit 142 stores the reference image information including the reference image and the position correction information for each product number of the terminal device 2.

The reference image information storage unit 142 is configured such that a lower left portion, for example, of a display screen of the display unit 12 is set as an origin, a horizontal direction from the origin is set as an x axis direction, and a vertical direction from the origin is set as a y axis direction. The reference image information storage unit 142 stores coordinate values indicating an amount by which the reference image is to be moved in the x axis direction or the y axis direction as the position correction information. The coordinate values are pixel positions of the display unit 12, for example.

When the product number of the terminal device 2 is not specified, a reference image depicting a central cross figure is stored in the reference image information storage unit 142. Further, when the reference image has not been corrected, 0 (x0, y0) is set in both the x axis direction and the y axis direction as the position correction information. Furthermore, the reference image is preferably a continuous image that connects to a target mark formed on a front surface of the terminal device 2. In FIG. 4, for example, the reference image corresponding to a product number "NA-XXX" is a continuous image that connects to operating buttons and logo marks such as "Wash", "Rinse", and "Dry" formed on the front surface of the terminal device 2 (a washer-drier, for example). As a result, an image moving operation for aligning the reference image displayed on the display unit 12 with the target mark formed on the front surface of the terminal device 2 can be performed easily.

Further, since the reference image corresponding to the product number "NA-XXX" has been corrected, the position correction information corresponding to the product number "NA-XXX" is constituted by coordinate values (x1, y1) by which the reference image is to be moved.

Note that the target mark may be any figure formed on the front surface of the terminal device 2 in the vicinity of the antenna. Further, the target mark may be alphabetic characters constituting a logo mark, an operating button, or the like.

Returning to FIG. 3, the near field wireless communication unit 15 communicates with the terminal device 2 via the loop antenna 11 using near field wireless communication.

The operating unit 16 is constituted by a touch panel, operating keys, and so on, for example, and receives input operations performed by a user.

The display control unit 17 controls the display unit 12. The display control unit 17 includes a reference image acquisition unit 171, a reference image display control unit 172, a reference image correction unit 173, and a position correction information creation unit 174.

The reference image acquisition unit 171 obtains the reference image for guiding the portable device 1 to the position in which near field wireless communication with the terminal device 2 is possible on the basis of the portable device identification information for identifying the type of the portable device 1. Further, the reference image acquisition unit 171 obtains the reference image on the basis of the portable device identification information and the product number information for identifying the terminal device 2.

The reference image display control unit 172 displays the reference image obtained by the reference image acquisition unit 171 on the display unit 12.

The reference image correction unit 173 corrects the position of the reference image in accordance with the image moving operation for aligning the reference image displayed on the display unit 12 with the target mark formed on the front surface of the terminal device 2. Further, the reference image correction unit 173 corrects the reference image obtained by the reference image acquisition unit 171 on the basis of the position correction information obtained by the reference image acquisition unit 171.

The position correction information creation unit 174 creates the position correction information indicating the position of the reference image corrected by the reference image correction unit 173.

The antenna 19 is used to establish a connection with the network 4. The mobile network communication unit 18 communicates with the server 3 via the network 4. The network 4 is a mobile communication network, for example.

The speaker 20 outputs various sounds. When near field wireless communication is established with the terminal device 2, the speaker 20 outputs a predetermined sound (a communication establishment sound).

The mobile network communication unit 18 includes an identification information transmission unit 181, a reference image information reception unit 182, and a position correction information transmission unit 183. The identification information transmission unit 181 transmits the portable device identification information stored in the identification information storage unit 141 to the server 3 connected via the network 4. The reference image information reception unit 182 receives reference image information corresponding to the portable device identification information from the server 3. The position correction information transmission unit 183 transmits the position correction information to the server 3.

Figure 5:
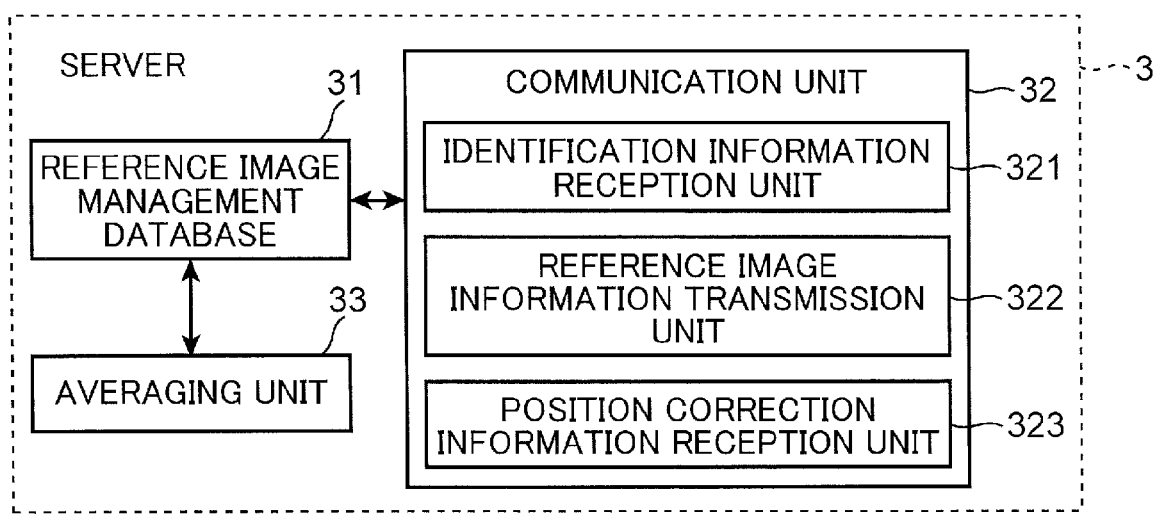
[FIG. 5]

FIG. 5 is a view showing an internal configuration of the server according to the first embodiment of the present invention. The server 3 is constituted by a known server computer or the like, and is connected to the portable device 1 communicably via the network 4. The server 3 shown in FIG. 5 includes a reference image management database 31, a communication unit 32, and an averaging unit 33.

The reference image management database 31 stores the portable device identification information for identifying the type of the portable device 1, the reference image for guiding the portable device 1 to the position in which near field wireless communication with the terminal device 2 is possible, and the position correction information indicating the corrected position of the reference image in association with each other.

Figure 6:
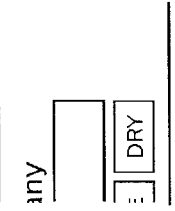
FIG. 6 is a view showing an example of reference image information stored in a reference image management database.
Figure 6:
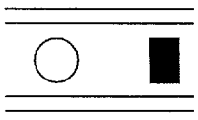

FIG. 6 is a view showing an example of the reference image information stored in the reference image management database.

As shown in FIG. 6, the reference image management database 31 stores reference image information including the reference image for guiding the portable device 1 to the position in which near field wireless communication with the terminal device 2 is possible and the position correction information indicating the corrected position of the reference image in association with the product number of the terminal device 2 for each piece of portable device identification information.

For example, reference image information including "Unspecified" and "NA-XXX" as the product number of the terminal device 2 is associated with portable device identification information "Pxxx". Reference image information including "NR-XXX" as the product number of the terminal device 2 is associated with portable device identification information "Sxxx". The reference image information also includes the reference image for guiding the portable device 1 to the position in which near field wireless communication with the terminal device 2 is possible, and the position correction information indicating the corrected position of the reference image. Note that the reference image information shown in FIG. 6 is identical to the reference image information shown in FIG. 4.

Returning to FIG. 5, the communication unit 32 communicates with the portable device 1 via the network 4. The communication unit 32 includes an identification information reception unit 321, a reference image information transmission unit 322, and a position correction information reception unit 323.

The identification information reception unit 321 receives the portable device identification information from the portable device 1. The reference image information transmission unit 322 selects reference image information from the reference image management database 31 on the basis of the portable device identification information received by the identification information reception unit 321. The reference image information transmission unit 322 transmits the selected reference image information to the portable device 1. In other words, the reference image information transmission unit 322 transmits the reference image for guiding the portable device 1 to the position in which near field wireless communication with the terminal device 2 is possible, stored in the reference image management database 31 in association with the received portable device identification information, to the portable device 1.

The identification information reception unit 321 may receive the terminal device identification information (the product number information) for identifying the terminal device 2 from the portable device 1. The reference image information transmission unit 322 may then transmit the reference image stored in association with the received portable device identification information to the portable device 1 on the basis of the received product number information.

The position correction information reception unit 323 receives the position correction information from the portable device 1. The position correction information reception unit 323 updates the position correction information stored in the reference image management database 31 to the received position correction information. Further, the position correction information reception unit 323 receives a plurality of position correction information corresponding to the portable device identification information. In other words, the position correction information reception unit 323 receives position correction information (first correction information) for correcting a display position in which the transmitted reference image is displayed from the portable device 1. The position correction information reception unit 323 then updates the position correction information (second correction information) indicating the position of the corrected reference image, which is stored in the reference image management database 31 in association with the received portable device identification information, on the basis of the received position correction information (the first correction information). Note that the reference image information transmission unit 322 transmits the position correction information (the second correction information) stored in association with the received portable device identification information to the portable device 1.

The averaging unit 33 averages the plurality of position correction information corresponding to the portable device identification information, received by the position correction information reception unit 323. The averaging unit 33 stores a predetermined number of pieces of position correction information corresponding to identical portable device identification information and identical terminal device product information, and averages the predetermined number of pieces of stored position correction information.

Note that in this embodiment, the portable device 1 corresponds to an example of a communication apparatus, the terminal device 2 corresponds to an example of an external apparatus, and the server 3 corresponds to an example of a server apparatus. The loop antenna 11 corresponds to an example of an antenna unit, and the display unit 12 corresponds to an example of a display unit. The reference image acquisition unit 171 corresponds to an example of a reference image acquisition unit, the reference image display control unit 172 corresponds to an example of a reference image display control unit, the reference image correction unit 173 corresponds to an example of a reference image correction unit, and the position correction information creation unit 174 corresponds to an example of a position correction information creation unit. The reference image information storage unit 142 corresponds to an example of a reference image storage unit of the communication apparatus, and the position correction information transmission unit 183 corresponds to an example of a position correction information transmission unit. The reference image management database 31 corresponds to an example of a reference image storage unit of the server apparatus. The identification information reception unit 321 corresponds to an example of a communication apparatus identification information reception unit, the reference image information transmission unit 322 corresponds to an example of a reference image transmission unit, and the position correction information reception unit 323 corresponds to an example of a position correction information reception unit. The averaging unit 33 corresponds to an example of an averaging unit of the server apparatus.

Figure 7:
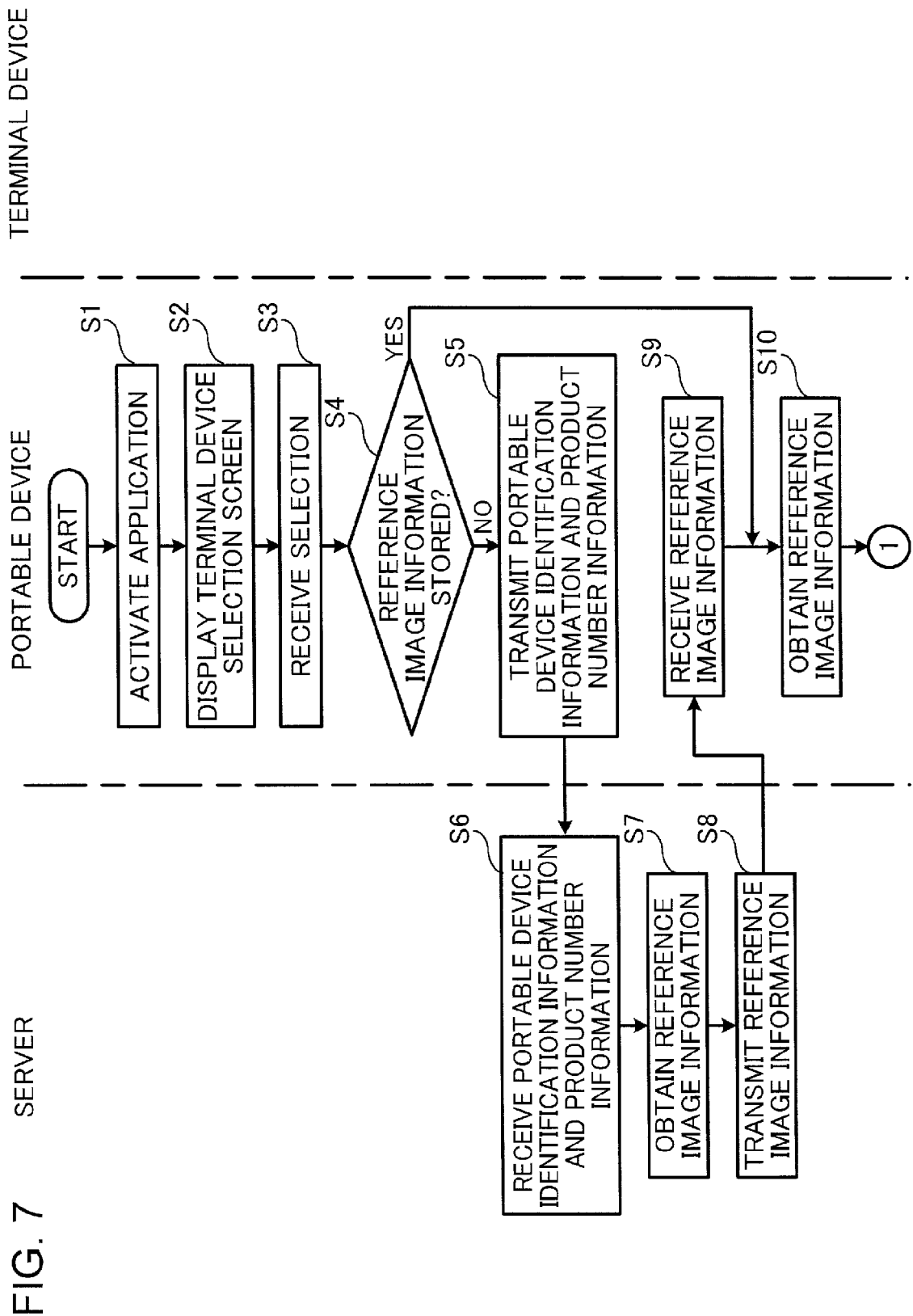
[FIG. 7]
Figure 8:
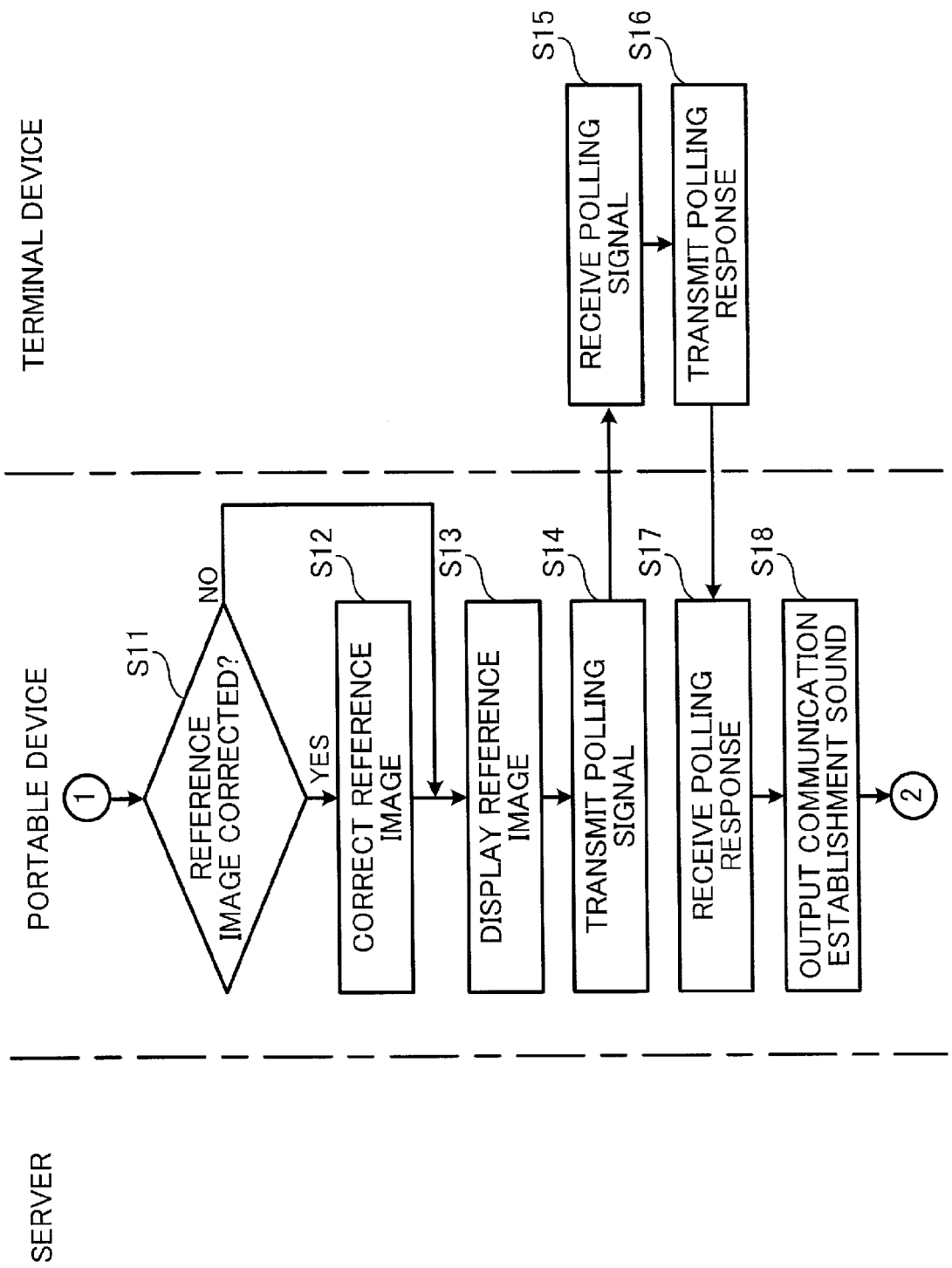
[FIG. 8]
Figure 9:
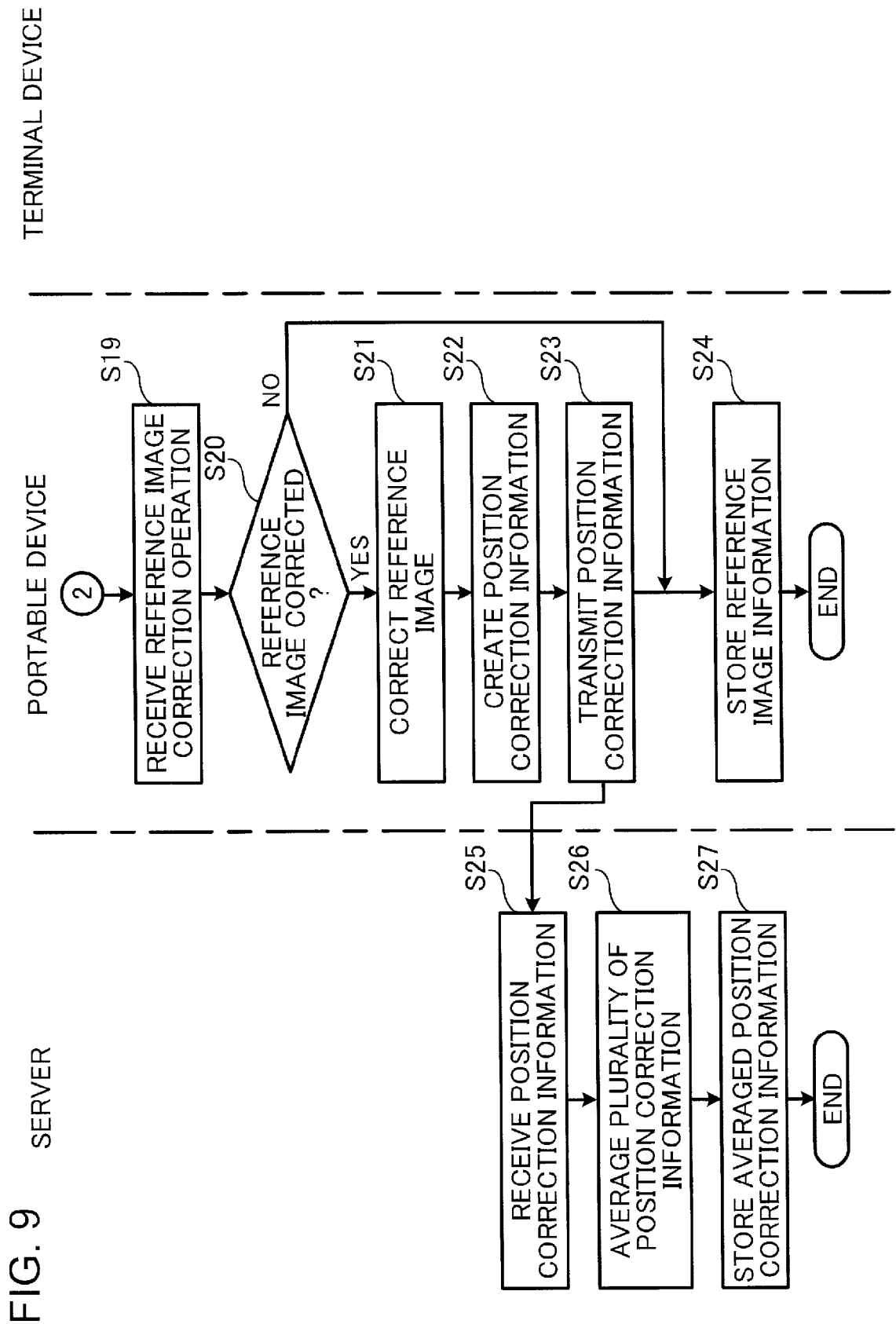
[FIG. 9]

Next, an operation of the communication system according to the first embodiment of the present invention will be described. FIGS. 7 to 9 are flowcharts illustrating the operation of the communication system according to the first embodiment of the present invention.

First, in step S1, the system control unit 13 of the portable device 1 activates an application for displaying the reference image for guiding the portable device 1 to the position in which near field wireless communication with the terminal device 2 is possible on the display unit 12. At this time, the operating unit 16 receives an instruction from the user to activate the application. The system control unit 13 activates the application on the basis of the received activation instruction.

Next, in step S2, the display control unit 17 controls the display unit 12 to display a terminal device selection screen for selecting a single terminal device from an owned device list of terminal devices owned by the user. The owned device list is stored in the memory unit 14. For example, the user registers a terminal device in the owned device list stored in the memory unit 14 by inputting the type, serial number, and so on of the terminal device. The display unit 12 is controlled by the display control unit 17 to display the terminal device selection screen.

In this embodiment, the owned device list is stored in the memory unit 14, but the present invention is not necessarily limited thereto, and the owned device list may be stored in the server. In this case, the mobile network communication unit 18 transmits an owned device list request requesting the owned device list indicating the terminal devices owned by the user to the server. The owned device list request includes the portable device identification information for identifying the portable device 1. Next, the communication unit of the server receives the owned device list request transmitted by the portable device 1. Next, the control unit of the server extracts the terminal device identification information corresponding to the portable device identification information included in the owned device list request from an owned device management database, and creates the owned device list from the extracted terminal device identification information. The terminal device identification information and the portable device identification information are stored in association in the owned device management database. Next, the communication unit of the server transmits the owned device list created by the control unit to the portable device 1. Next, the mobile network communication unit 18 of the portable device 1 receives the owned device list transmitted by the server. Next, the display control unit 17 controls the display unit 12 to display the terminal device selection screen for selecting a single terminal device from the owned device list received by the mobile network communication unit 18.

Figure 10:
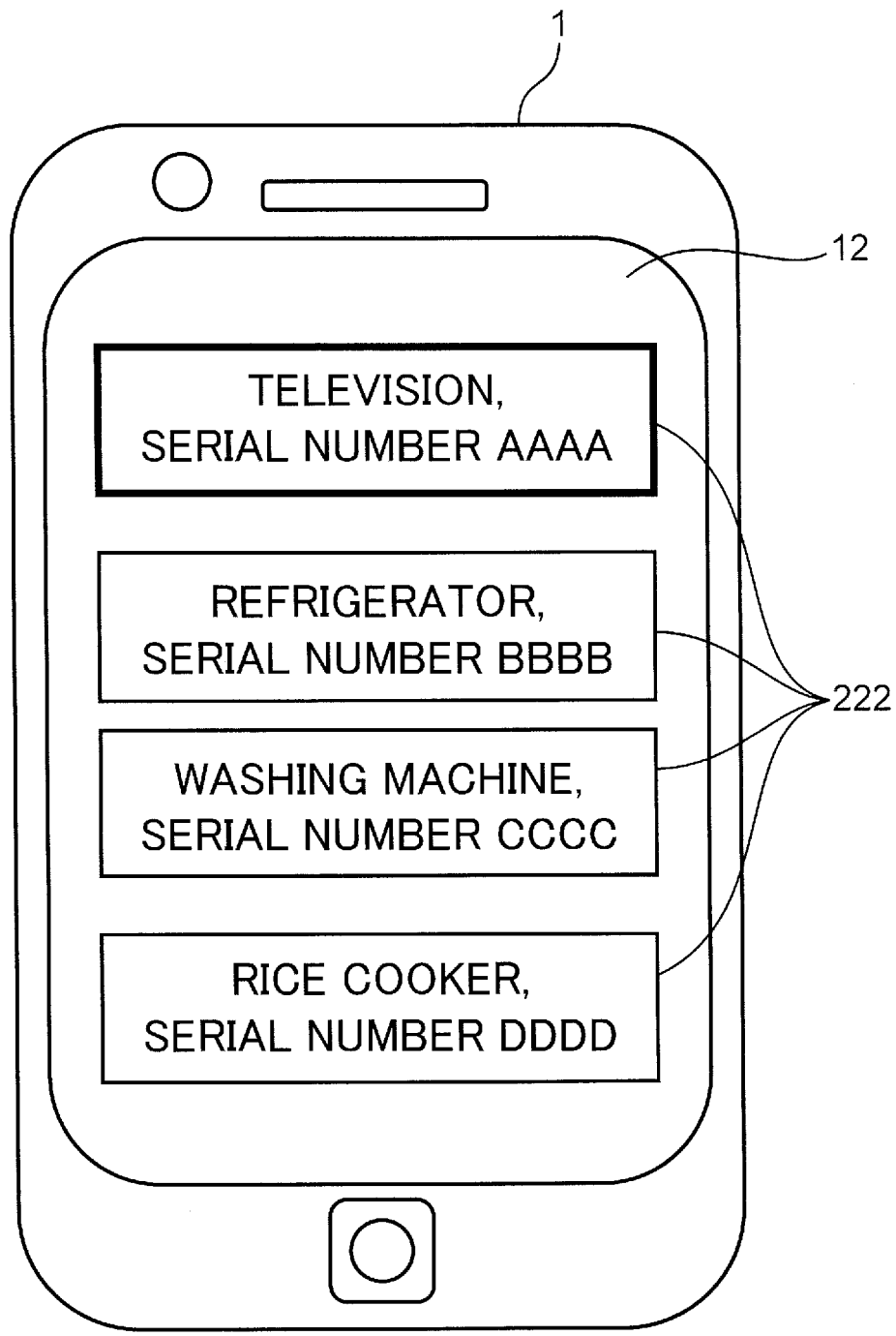
[FIG. 10]

FIG. 10 is a view showing an example of the terminal device selection screen displayed on the display unit. Type names and serial numbers of terminal devices are displayed in a selectable fashion on the terminal device selection screen. Four selection items 222 indicating selectable terminal devices are displayed on the terminal device selection screen of FIG. 10. The respective selection items 222 are, for example: "Television, Serial Number AAAA"; "Refrigerator, Serial Number BBBB"; "Washing Machine, Serial Number CCCC", and "Rice Cooker, Serial Number DDDD". Note that information stored in advance in the memory unit 14 in association with the serial number may be displayed instead of the serial number.

Next, in step S3, the operating unit 16 receives a selection of a terminal device with which to perform near field wireless communication from among the terminal devices displayed on the terminal device selection screen.

The user selects the terminal device with which to perform near field wireless communication from the selection items 222 displayed on the display unit 12. The operating unit 16 receives a terminal device selection operation performed by the user. When the display unit 12 is a touch panel, a desired selection item is selected by touching a display screen. When the display unit 12 is not a touch panel, the desired selection item is selected by operating an operating member provided on the portable device 1. Note that when the terminal device with which the user wishes to communicate is not registered on the owned device list stored in the memory unit 14, the corresponding terminal device is not displayed on the terminal device selection screen. In this case, the operating unit 16 may receive product number information input by the user. Furthermore, in a case where the terminal device is specified without being selected by the user, step S3 is not required.

Next, in step S4, the reference image acquisition unit 171 determines whether or not the reference image information of the terminal device selected by the user is stored in the reference image information storage unit 142. Here, when it is determined that the reference image information is stored (YES in step S4), the processing advances to step S10.

When it is determined that the reference image information is not stored (NO in step S4), on the other hand, the identification information transmission unit 181 transmits the portable device identification information stored in the identification information storage unit 141 and the product number information of the terminal device selected by the user to the server 3 in step S5.

Next, in step S6, the identification information reception unit 321 of the server 3 receives the portable device identification information and product number information transmitted by the portable device 1.

Next, in step S7, the reference image information transmission unit 322 of the server 3 obtains the reference image information corresponding to the portable device identification information and product number information received by the identification information reception unit 321 from the reference image management database 31.

Next, in step S8, the reference image information transmission unit 322 of the server 3 transmits the reference image information obtained from the reference image management database 31 to the portable device 1.

Next, in step S9, the reference image information reception unit 182 of the portable device 1 receives the reference image information transmitted by the server 3.

Next, in step S10, the reference image acquisition unit 171 obtains the reference image information received by the reference image information reception unit 182. Note that when it is determined in step S4 that the reference image information is stored, the reference image acquisition unit 171 obtains the reference image information of the terminal device selected by the user from the reference image information storage unit 142. The reference image information may be stored in the reference image information storage unit 142 in advance at the time of manufacture of the portable device 1. In this case, the reference image information includes the uncorrected reference image.

Next, in step S11, the reference image display control unit 172 determines whether or not the reference image included in the reference image information obtained by the reference image acquisition unit 171 has been corrected. Here, the reference image display control unit 172 determines whether or not the reference image has been corrected on the basis of the position correction information included in the reference image information. More specifically, when a value of the position correction information is a value indicating that the reference image has not been corrected, the reference image display control unit 172 determines that the reference image has not been corrected, and when the value of the position correction information is a value indicating that the reference image has been corrected, the reference image display control unit 172 determines that the reference image has been corrected.

When it is determined that the reference image has not been corrected (NO in step S11), the processing advances to step S13.

When it is determined that the reference image has been corrected (YES in step S11), on the other hand, the reference image correction unit 173 corrects the position of the reference image in accordance with the position correction information in step S12.

Next, in step S13, the reference image display control unit 172 displays the reference image on the display unit 12. When, at this time, the reference image has not been corrected, the reference image display control unit 172 displays the uncorrected reference image on the display unit 12. When the reference image has already been corrected, the reference image display control unit 172 displays the corrected reference image on the display unit 12.

Next, in step S14, the near field wireless communication unit 15 transmits a polling signal to the terminal device 2 via the loop antenna 11.

Next, in step S15, the near field wireless communication unit 203 of the terminal device 2 receives the polling signal from the portable device 1 via the loop antenna 204.

Next, in step S16, the near field wireless communication unit 203 transmits a polling response to the portable device 1 via the loop antenna 204.

Next, in step S17, the near field wireless communication unit 15 of the portable device 1 receives the polling response from the terminal device 2 via the loop antenna 11.

The near field wireless communication unit 15 of the portable device 1 transmits the polling signal to the terminal device 2 at predetermined time intervals (0.5 second intervals, for example) until the polling response is received from the terminal device 2. The user moves the portable device 1 to bring the reference image displayed on the display unit 12 close to the target mark formed on the front surface of the terminal device 2. The user performs the operation to move the portable device 1 in the vicinity of the target mark formed on the front surface of the terminal device 2 until the polling response is received.

Next, in step S18, upon reception of the polling response from the terminal device 2, the near field wireless communication unit 15 outputs the communication establishment sound indicating that near field wireless communication with the terminal device 2 has been established via the speaker 20. The user performs the operation to move the portable device 1 in the vicinity of the target mark formed on the front surface of the terminal device 2. The user stops the operation to move the portable device 1 after hearing the communication establishment sound.

In this embodiment, the communication establishment sound is output upon reception of the polling request from the terminal device 2. However, the present invention is not necessarily limited thereto, and instead, a communication establishment screen indicating that near field wireless communication with the terminal device 2 has been established may be displayed on the display unit 12 upon reception of the polling request from the terminal device 2. The user stops the operation to move the portable device 1 after confirming that the communication establishment screen is displayed on the display unit 12.

Next, in step S19, the operating unit 16 receives a reference image correction operation performed by the user. The operating unit 16 receives a correction operation for aligning the reference image displayed on the display unit 12 with the target mark formed on the front surface of the terminal device 2. When the display unit 12 is a touch panel, the reference image is moved by dragging the reference image with a finger to a position where the displayed reference image is aligned with the target mark formed on the front surface of the terminal device 2. When the display unit 12 is not a touch panel, the reference image is moved by operating an operating member provided on the portable device 1. Note that when the displayed reference image is aligned with the target mark formed on the front surface of the terminal device 2 at the point where the user hears the communication establishment sound, the user need not move the reference image.

Next, in step S20, the reference image correction unit 173 determines whether or not the correction operation for correcting the reference image has been performed by the user. Here, when it is determined that the correction operation has not been performed (NO in step S20), the processing advances to step S24.

When it is determined that the correction operation has been performed (YES in step S20), on the other hand, the reference image correction unit 173 displays the reference image in a corrected position in step S21 in response to the image moving operation for aligning the reference image displayed on the display unit 12 with the target mark formed on the front surface of the terminal device 2.

Next, in step S22, the position correction information creation unit 174 creates position correction information indicating the position of the reference image corrected by the reference image correction unit 173. Note that the position correction information creation unit 174 may create the position correction information after obtaining confirmation from the user via the display unit 12 or when the dragged finger is removed from the display unit 12.

Next, in step S23, the position correction information transmission unit 183 transmits the position correction information to the server 3. At this time, the position correction information transmission unit 183 transmits the position correction information to the server 3 together with the portable device identification information and the product number information.

Next, in step S24, the position correction information creation unit 174 stores the reference image information in the reference image information storage unit 142. When the reference image has been corrected, the position correction information creation unit 174 stores reference image information including the position correction information created by the position correction information creation unit 174 and the reference image in the reference image information storage unit 142. When the reference image has not been corrected, the position correction information creation unit 174 stores the reference image information obtained in step S10 in the reference image information storage unit 142.

In this embodiment, the position correction information created by the position correction information creation unit 174 is stored in the reference image information storage unit 142 in association with the reference image and transmitted to the server 3 in association with the portable device identification information. However, the present invention is not necessarily limited thereto, and the position correction information created by the position correction information creation unit 174 may be stored in the reference image information storage unit 142 in association with the reference image without being transmitted to the server 3 in association with the portable device identification information. Further, the position correction information created by the position correction information creation unit 174 may be transmitted to the server 3 in association with the portable device identification information without being stored in the reference image information storage unit 142 in association with the reference image.

Next, in step S25, the position correction information reception unit 323 receives the position correction information transmitted by the position correction information transmission unit 183 of the portable device 1.

Next, in step S26, the averaging unit 33 averages the plurality of position correction information corresponding to the portable device identification information and product number information received by the position correction information reception unit 323.

Next, in step S27, the averaging unit 33 stores the averaged position correction information in the reference image management database 31 in association with the portable device identification information and product number information. As a result, the position correction information stored in the reference image management database 31 is updated to the averaged position correction information.

Note that the server 3 need not include the averaging unit 33. In this case, the position correction information reception unit 323 receives the position correction information from the portable device 1 and updates the position correction information stored in the reference image management database 31 to the received position correction information.

Next, the operation of the communication system according to the first embodiment of the present invention will be described more specifically. FIGS. 11 to 14 are pattern diagrams illustrating the operation of the communication system according to the first embodiment of the present invention specifically.

Figure 11:
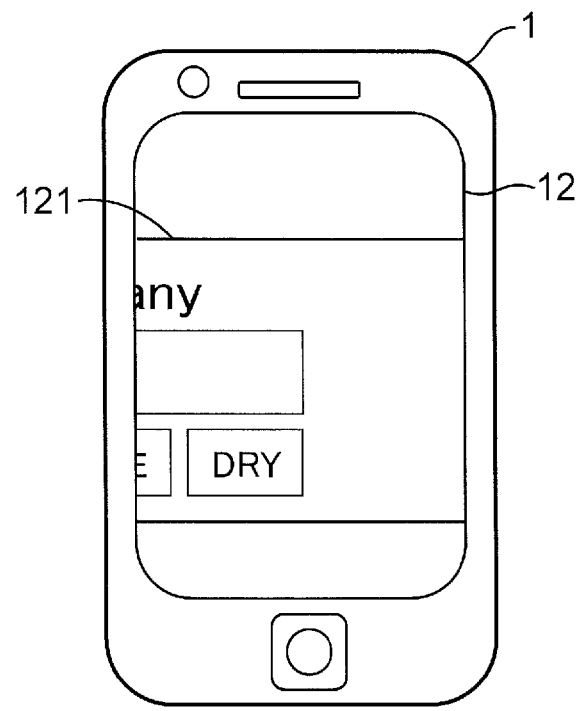
[FIG. 11]
Figure 12:
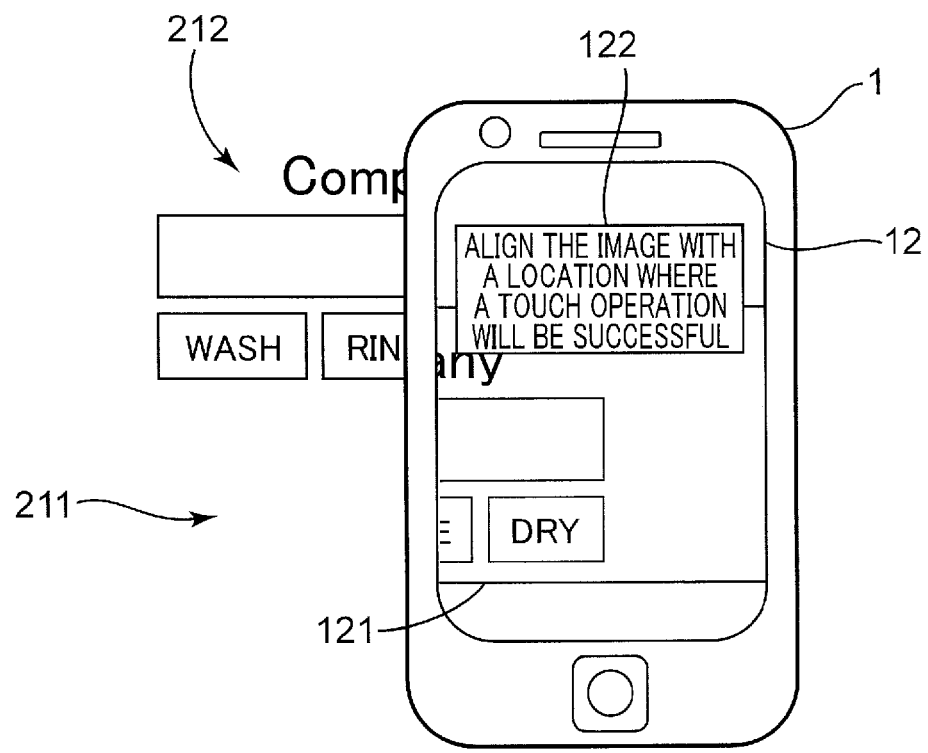
[FIG. 12]
Figure 13:
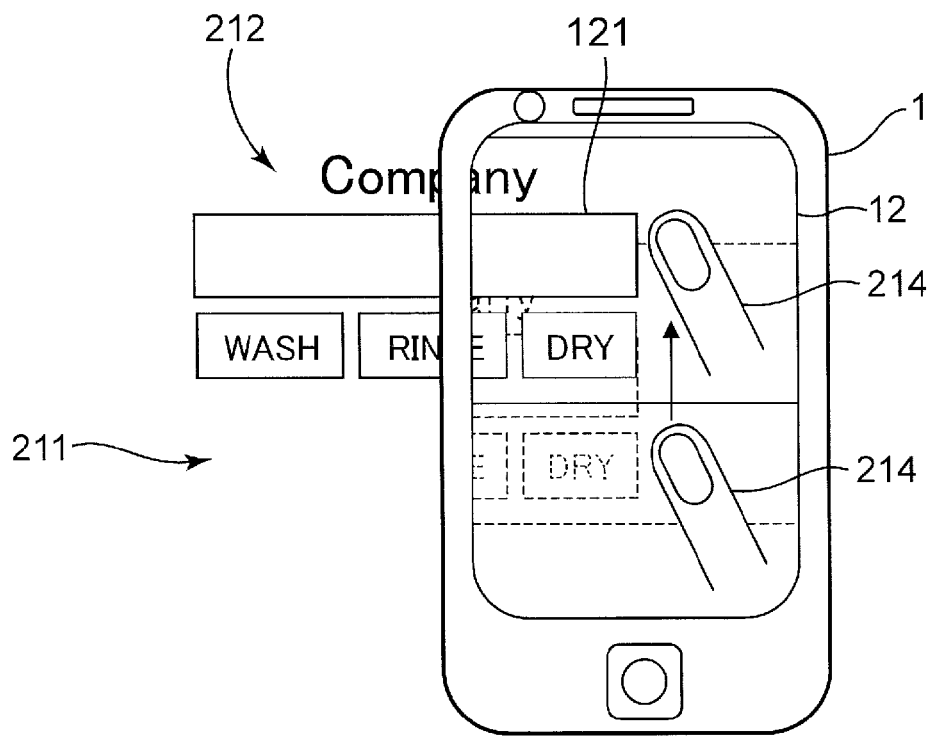
[FIG. 13]
Figure 14:
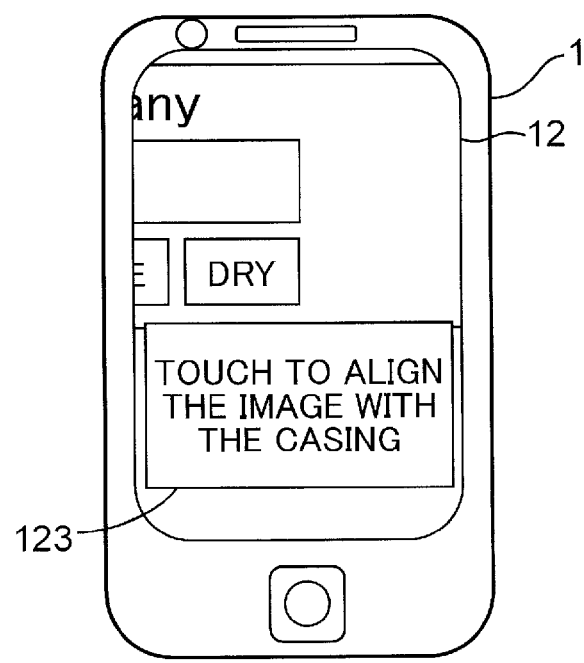
[FIG. 14]

FIG. 11 is a view showing the reference image displayed on the display unit of the portable device in step S13 of FIG. 8 when the reference image has not been corrected. FIG. 12 is a view showing the portable device at the point where near field wireless communication with the terminal device 2 is established in step S18 of FIG. 8. FIG. 13 is a view illustrating the reference image correction operation performed by the user in step S19 of FIG. 9. FIG. 14 is a view showing the reference image displayed on the display unit of the portable device in step S13 of FIG. 8 when the reference image has already been corrected.

As shown in FIG. 11, a reference image 121 is displayed on the display unit 12 of the portable device 1. The reference image 121 is a continuous image that connects to the operating buttons and logo marks such as "Wash", "Rinse", and "Dry" formed on the front surface of the terminal device 2 (a washer-drier, for example). In other words, an image showing a part of the target mark formed on the front surface of the terminal device 2 is displayed as the reference image 121. Further, in FIG. 11, the position of the reference image 121 has not been corrected, and therefore the reference image 121 is displayed in a central part of the display unit 12.

Next, as shown in FIG. 12, the user touches the portable device 1 to the vicinity of a target mark 212 fanned on a front surface 211 of the terminal device 2 such that the portable device 1 is moved to the position in which near field wireless communication is possible. At the point where near field wireless communication with the terminal device 2 is established, a message 122 prompting the user to perform the reference image correction operation is displayed on the display unit 12. In FIG. 12, for example, the displayed message 122 says "Align the image with a location where a touch operation will be successful". In this message, a "touch operation" is an operation for performing near field wireless communication by bringing the loop antenna 204 of the terminal device 2 and the loop antenna 11 of the portable device 1 close together.

Next, as shown in FIG. 13, the operating unit 16 receives a correction operation for aligning the reference image 121 displayed on the display unit 12 with the target mark 212 formed on the front surface 211 of the terminal device 2. When the display unit 12 is a touch panel, the reference image 121 is moved by dragging the displayed reference image 121 to a target position with a finger 214. In FIG. 13, the reference image 121 prior to movement is indicated by dotted lines, and the reference image 121 following movement is indicated by solid lines.

When the reference image has been corrected as described above, the corrected position correction information is stored in the reference image information storage unit 142. When the reference image has already been corrected, as shown in FIG. 14, a message 123 prompting the user to bring the portable device 1 close to the terminal device 2 may be displayed on the display unit 12. In FIG. 14, for example, the displayed message 123 says "Touch to align the image with the casing". By displaying the message 123 prompting the user to bring the portable device 1 close to the terminal device 2 in this manner, the user can be made aware that correction of the reference image has already been completed.

In the first embodiment, the product number information of the terminal device 2 is stored in the portable device 1 in advance, and therefore the product number information of the terminal device 2 is obtainable. In certain cases, however, it is not possible to obtain the product number information of the terminal device 2.

Hence, a case in which the portable device 1 cannot obtain the product number information of the terminal device 2 will now be described.

FIGS. 15 to 18 are pattern diagrams illustrating a specific operation of the communication system according to a first modified example of the first embodiment in a case where the portable device cannot obtain the product number information of the terminal device.

Figure 15:
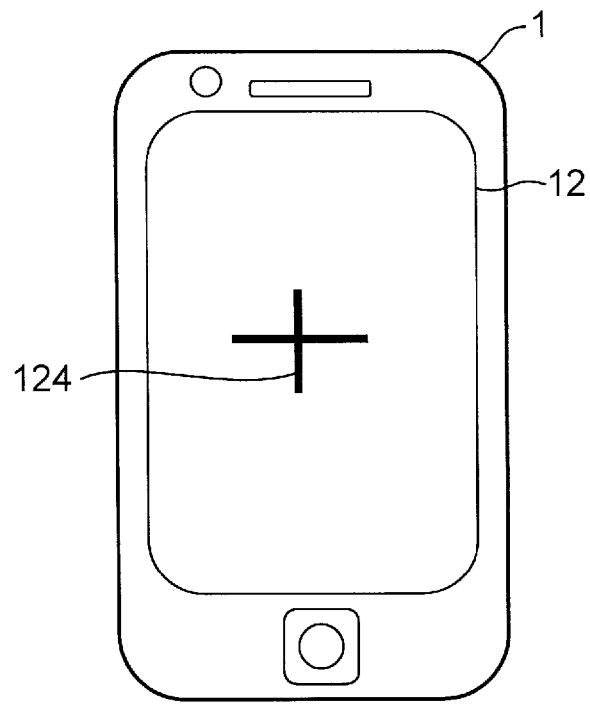
[FIG. 15]
Figure 16:
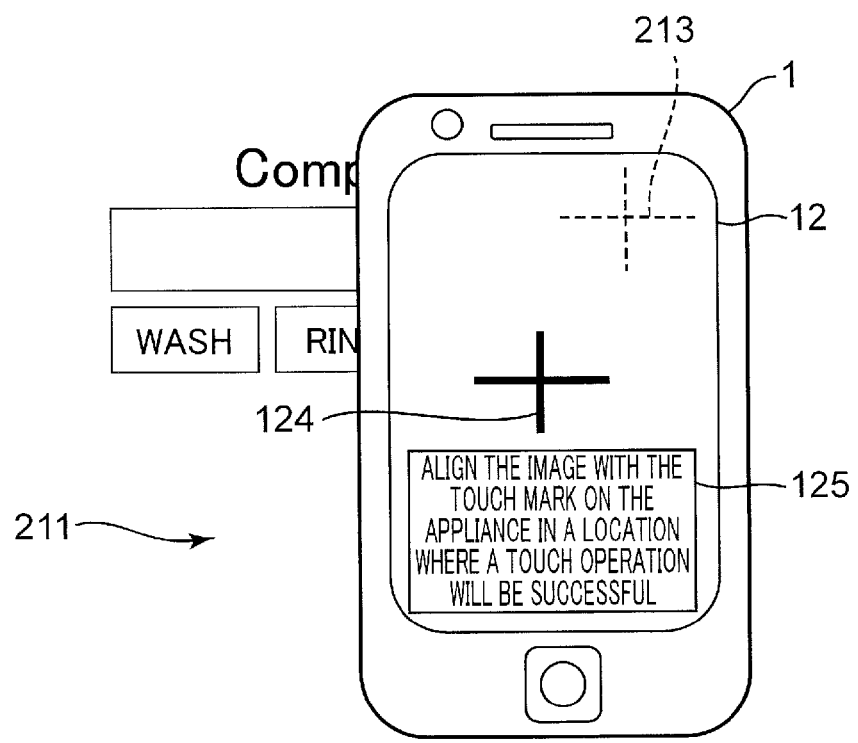
[FIG. 16]
Figure 17:
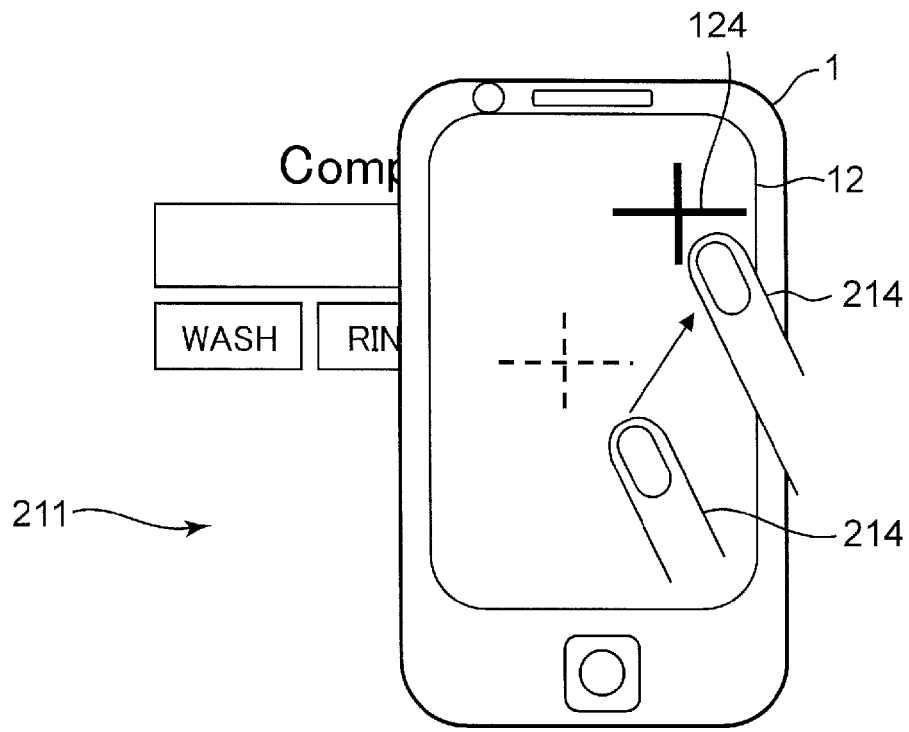
[FIG. 17]
Figure 18:
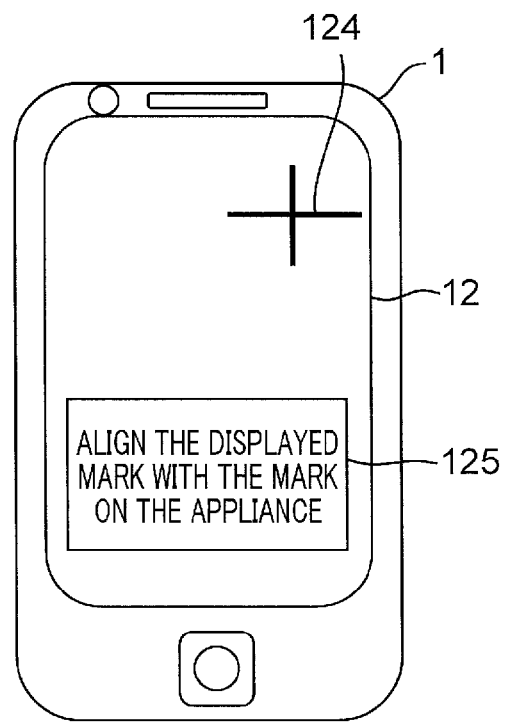
[FIG. 18]

FIG. 15 is a view showing the reference image displayed on the display unit of the portable device when the portable device cannot obtain the product number information of the terminal device and the reference image has not been corrected. FIG. 16 is a view showing the portable device at the point where near field wireless communication with the terminal device 2 is established in a case where the portable device cannot obtain the product number information of the terminal device. FIG. 17 is a view illustrating the reference image correction operation performed by the user when the portable device cannot obtain the product number information of the terminal device. FIG. 18 is a view showing the reference image displayed on the display unit of the portable device when the portable device cannot obtain the product number information of the terminal device and the reference image has already been corrected.

When the terminal device with which the user wishes to communicate is not registered on the owned device list stored in the memory unit 14, the terminal device is not displayed on the terminal device selection screen. The user does not therefore select the desired terminal device. In this case, the identification information transmission unit 181 transmits only the portable device identification information for identifying the type of the portable device 1 to the server 3 in step S5 of FIG. 7.

The identification information reception unit 321 of the server 3 receives the portable device identification information transmitted by the portable device 1. Next, the reference image information transmission unit 322 of the server 3 obtains the reference image information corresponding to the portable device identification information received by the identification information reception unit 321 from the reference image management database 31. Here, the reference image information obtained by the reference image information transmission unit 322 is not associated with any product number information. For example, the reference image information corresponding to "Unspecified" in FIG. 6 is obtained.

Next, the reference image information transmission unit 322 of the server 3 transmits the reference image information obtained from the reference image management database 31 to the portable device 1. Next, the reference image information reception unit 182 of the portable device 1 receives the reference image information transmitted by the server 3. Next, the reference image acquisition unit 171 obtains the reference image information received by the reference image information reception unit 182.

Next, the reference image display control unit 172 displays a reference image on the display unit 12. As shown in FIG. 15, a reference image 124 is displayed on the display unit 12 of the portable device 1. The reference image 124 is an identical image to a cross-shaped target mark formed on the front surface of the terminal device 2 (a washer-drier, for example). In other words, an image representing the target mark formed on the front surface of the terminal device 2 is displayed as the reference image 124. Further, in FIG. 15, the position of the reference image 124 has not been corrected, and therefore the reference image 124 is displayed in the central part of the display unit 12.

In this embodiment, the reference image 124 is an identical image to the target mark formed on the front surface of the terminal device 2. However, the present invention is not necessarily limited thereto, and as long as the reference image 124 is a figure that can be positioned, the reference image 124 need not be an identical image to the target mark formed on the front surface of the terminal device 2.

Next, as shown in FIG. 16, the user touches the portable device 1 to the vicinity of a target mark 213 formed on the front surface 211 of the terminal device 2 such that the portable device 1 is moved into the position in which near field wireless communication is possible. At the point where near field wireless communication with the terminal device 2 is established, a message 125 prompting the user to perform the reference image correction operation is displayed on the display unit 12. In FIG. 16, for example, the displayed message 125 says "Align the image with the touch mark on the appliance in a location where a touch operation will be successful".

Next, as shown in FIG. 17, the operating unit 16 receives a correction operation for aligning the reference image 124 displayed on the display unit 12 with the target mark 213 formed on the front surface 211 of the terminal device 2. When the display unit 12 is a touch panel, the reference image 124 is moved by dragging the displayed reference image 124 with the finger 214 to a position where the reference image 124 is aligned with the target mark formed on the front surface of the terminal device 2. In FIG. 17, the reference image 124 prior to movement is indicated by dotted lines, and the reference image 124 following movement is indicated by solid lines.

When the reference image has been corrected as described above, the corrected position correction information is stored in the reference image information storage unit 142. When the reference image has already been corrected, as shown in FIG. 18, a message 126 prompting the user to bring the portable device 1 close to the terminal device 2 may be displayed on the display unit 12. In FIG. 18, for example, the displayed message 126 says "Align the displayed mark with the mark on the appliance". By displaying the message 126 prompting the user to bring the portable device 1 close to the terminal device 2 in this manner, the user can be made aware that correction of the reference image has already been completed.

Hence, even when the portable device 1 is unable to obtain the product number information of the terminal device 2, the reference image can be obtained from the server and the position of the obtained reference image can be corrected.

Further, in the first embodiment, the product number information of the terminal device 2 is stored in advance in the portable device 1, but the product number information may be obtained from the terminal device 2.

Therefore, a case in which the portable device 1 obtains the product number information from the terminal device 2 will now be described.

Figure 19:
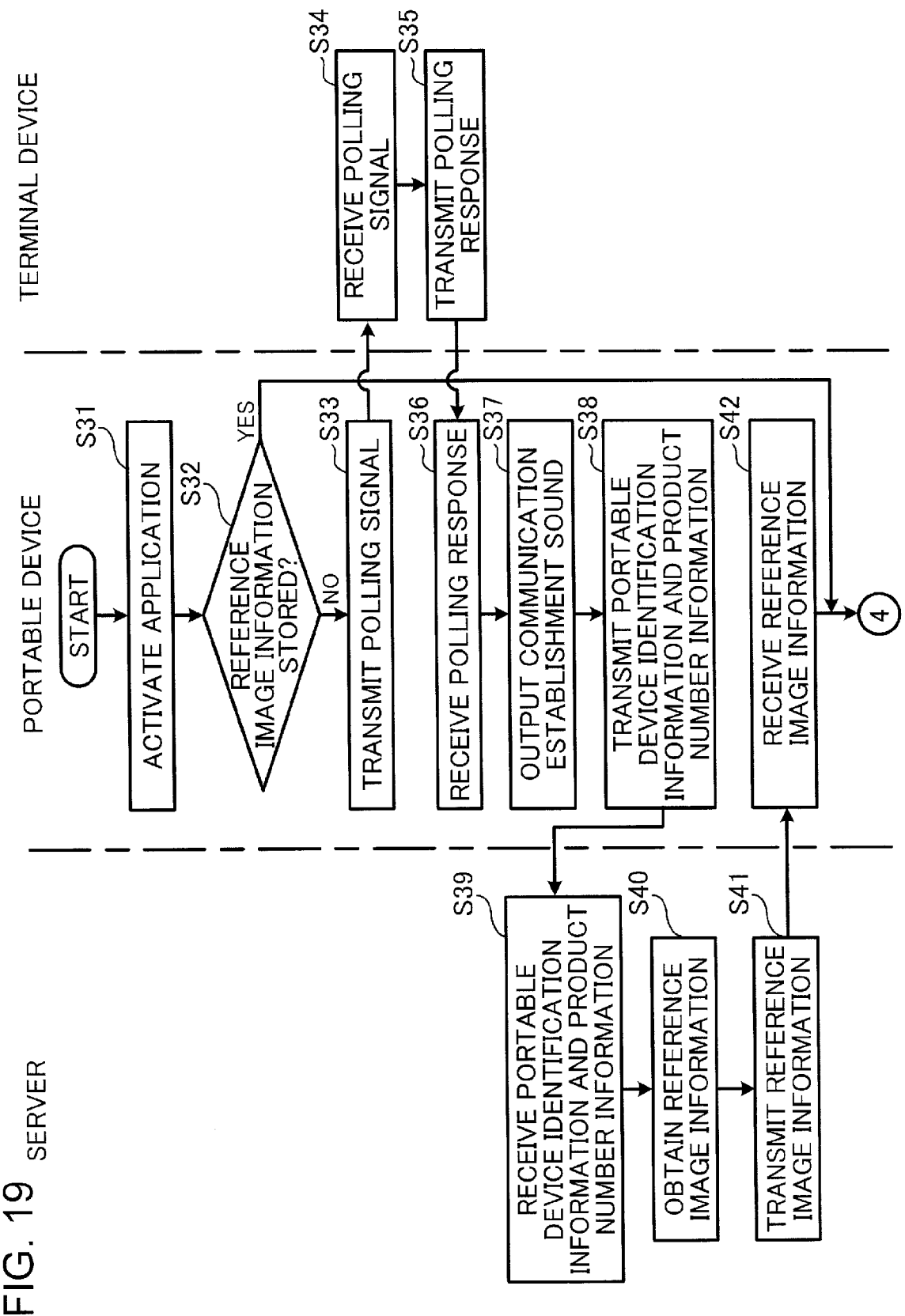
[FIG. 19]
Figure 20:
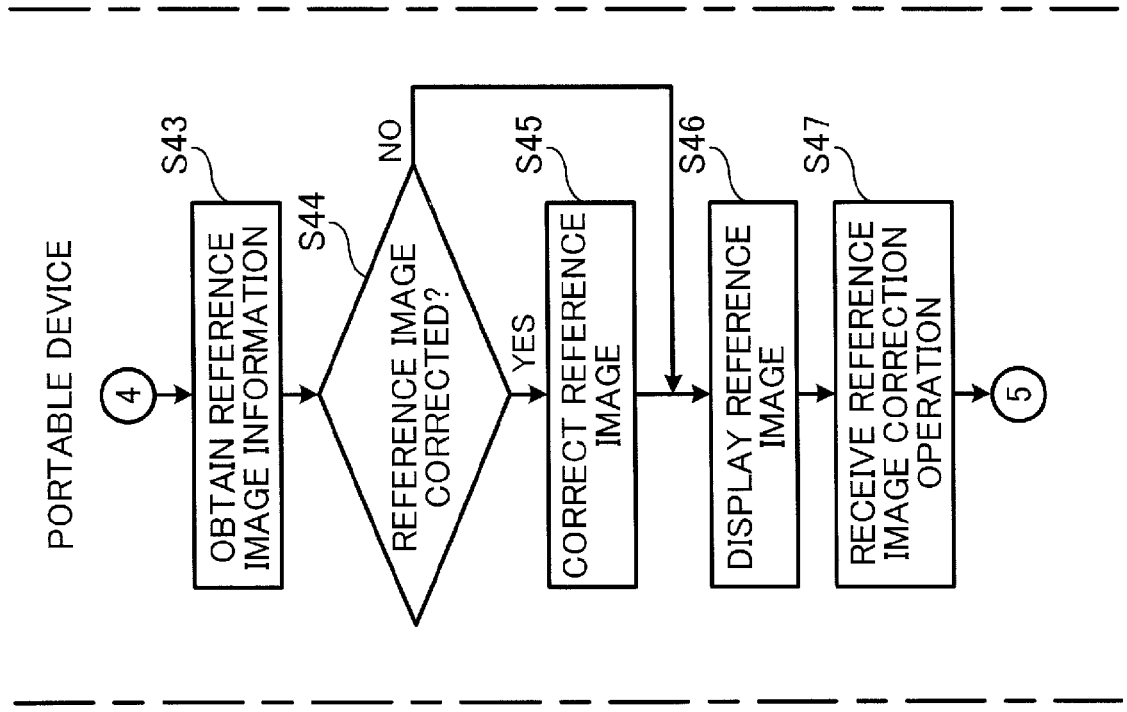
[FIG. 20]
Figure 21:
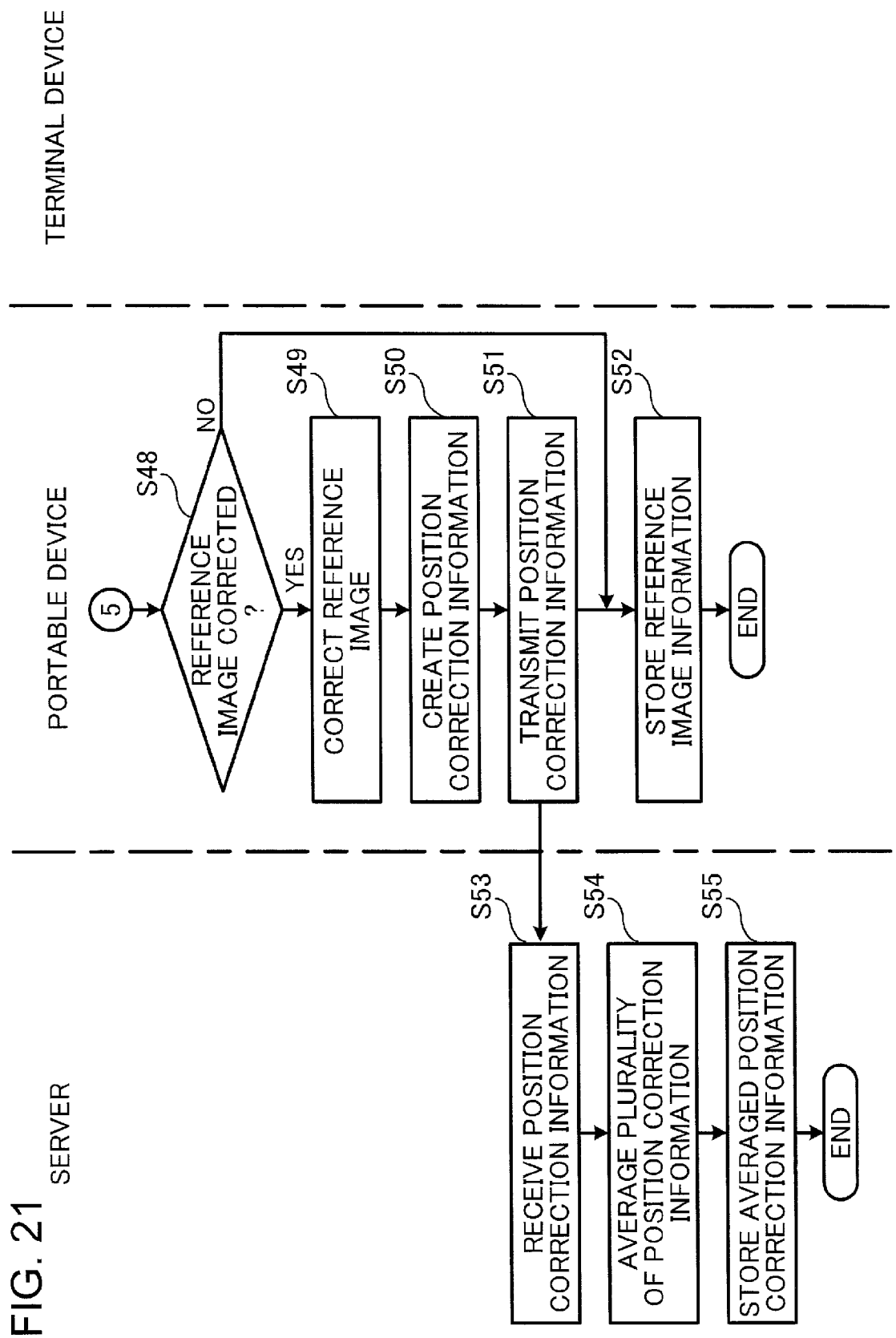
[FIG. 21]

FIGS. 19 to 21 are flowcharts illustrating an operation of the communication system according to a second modified example of the first embodiment of the present invention in a case where the portable device obtains the product number information from the terminal device.

Note that the communication system according to the second modified example of the first embodiment of the present invention is configured identically to FIGS. 1, 3, and 5. Therefore, the communication system shown in FIGS. 1, 3, and 5 will be referred to in the following description.

First, processing of step S31 is identical to the processing of step S1 in FIG. 7, and therefore description thereof has been omitted.

Next, in step S32, the reference image acquisition unit 171 determines whether or not the reference image information of the terminal device is stored in the reference image information storage unit 142. The determination as to whether or not the reference image information of the terminal device is stored is made by confirming with the user whether or not to obtain the reference image information. More specifically, for example, the reference image acquisition unit 171 displays a screen for confirming with the user whether or not to obtain the reference image information on the display unit 12, whereupon the operating unit 16 receives a selection from the user indicating whether or not the reference image information is to be obtained. When the reference image information is to be obtained, the reference image acquisition unit 171 determines that the reference image information of the terminal device is not stored, and when the reference image information is not to be obtained, the reference image acquisition unit 171 determines that the reference image information of the terminal device is stored. Here, when it is determined that the reference image information is stored (YES in step S32), the processing advances to step S43.

When it is determined that the reference image information is not stored (NO in step S32), on the other hand, the near field wireless communication unit 15 transmits the polling signal to the terminal device 2 via the loop antenna 11 in step S33.

Next, in step S34, the near field wireless communication unit 203 of the terminal device 2 receives the polling signal from the portable device 1 via the loop antenna 204.

Next, in step S35, the near field wireless communication unit 203 transmits the polling response to the portable device 1 via the loop antenna 204. Here, the polling response includes the product number information of the terminal device 2.

Next, in step S36, the near field wireless communication unit 15 of the portable device 1 receives the polling response from the terminal device 2 via the loop antenna 11.

The near field wireless communication unit 15 of the portable device 1 transmits the polling signal to the terminal device 2 at predetermined time intervals (0.5 second intervals, for example) until the polling response is received from the terminal device 2. The user performs the operation to move the portable device 1 in the vicinity of the target mark formed on the front surface of the terminal device 2 until the polling response is received.

Next, in step S37, upon reception of the polling response from the terminal device 2, the near field wireless communication unit 15 outputs the communication establishment sound indicating that near field wireless communication with the terminal device 2 has been established via the speaker 20. The user performs the operation to move the portable device 1 in the vicinity of the target mark formed on the front surface of the terminal device 2, and stops the operation to move the portable device 1 after hearing the communication establishment sound.

In this embodiment, the communication establishment sound is output upon reception of the polling request from the terminal device 2. However, the present invention is not necessarily limited thereto, and instead, the communication establishment screen indicating that near field wireless communication with the terminal device 2 has been established may be displayed on the display unit 12 upon reception of the polling request from the terminal device 2. The user stops the operation to move the portable device 1 after confirming that the communication establishment screen is displayed on the display unit 12.

Next, in step S38, the identification information transmission unit 181 transmits the portable device identification information stored in the identification information storage unit 141 and the product number information of the terminal device included in the polling response to the server 3.

Processing of steps S39 to S46 is identical to the processing of steps S6 to S13 in FIGS. 7 and 8, and therefore description thereof has been omitted. Further, processing of steps S47 to S55 is identical to the processing of steps S19 to S27 in FIGS. 8 and 9, and therefore description thereof has been omitted.

As a result of the processing described above, the reference image is displayed on the display unit 12 of the portable device 1 and the reference image correction operation is received at the point where near field wireless communication with the terminal device 2 is established.

Next, the operation of the communication system according to the second modified example of the first embodiment of the present invention will be described more specifically. FIGS. 22 to 25 are pattern diagrams illustrating the operation of the communication system according to the second modified example of the first embodiment of the present invention specifically.

Figure 22:
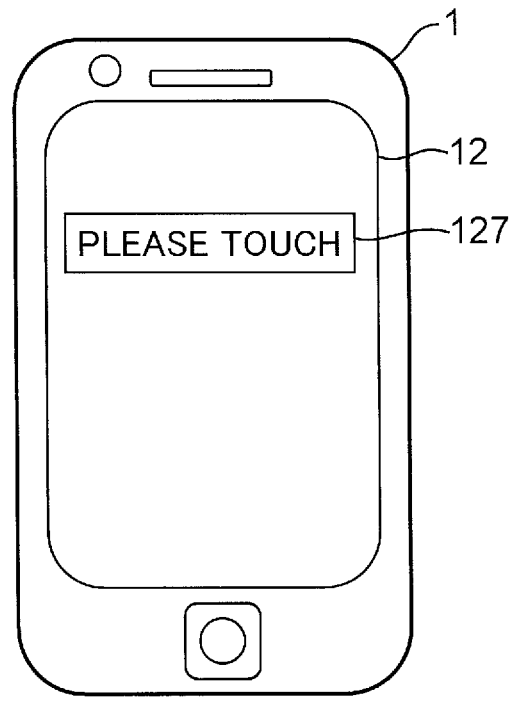
[FIG. 22]
Figure 23:
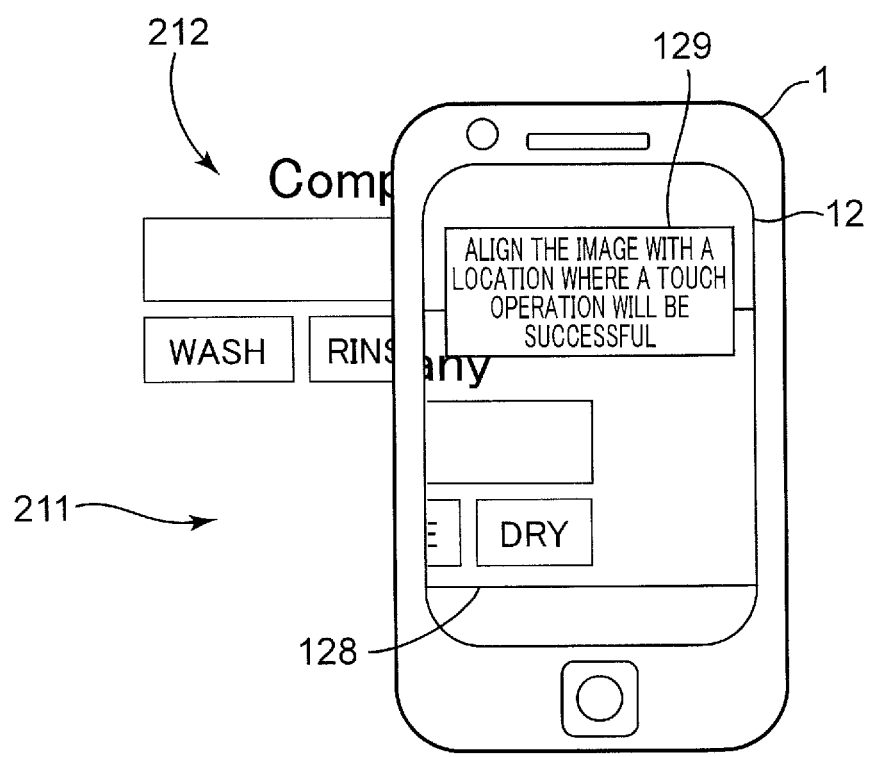
[FIG. 23]
Figure 24:
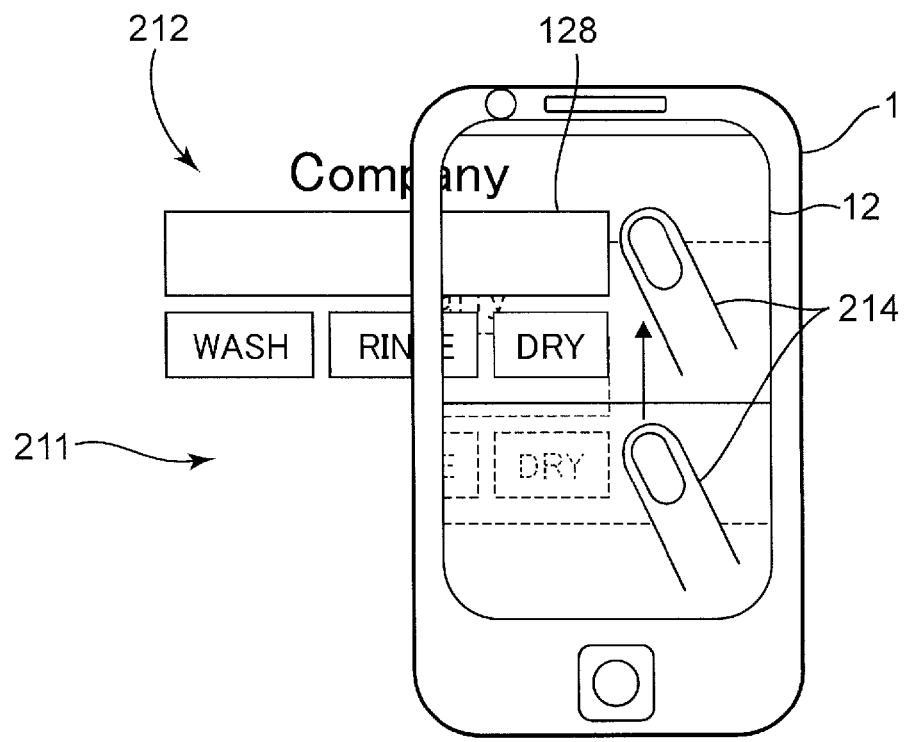
[FIG. 24]
Figure 25:
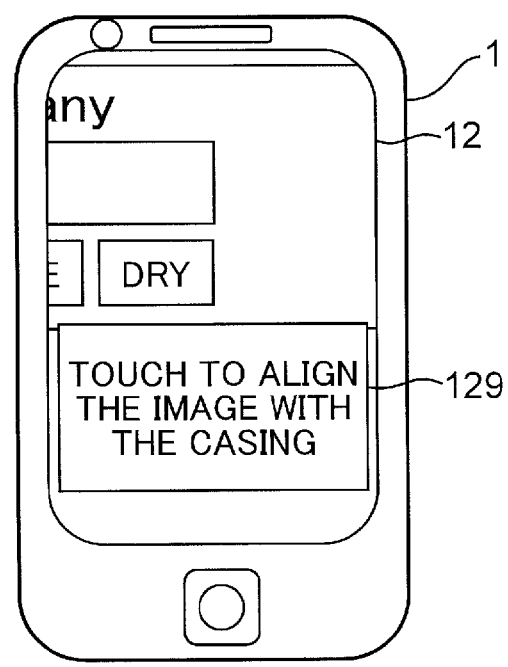
[FIG. 25]

FIG. 22 is a view showing a message displayed on a display unit 12 after the near field wireless communication unit 15 starts to transmit the polling signal in step S33 of FIG. 19. FIG. 23 is a view showing the portable device at the point where the reference image is displayed in step S46 of FIG. 20. FIG. 24 is a view illustrating the reference image correction operation performed by the user in step S47 of FIG. 20. FIG. 25 is a view showing the reference image displayed on the display unit of the portable device in step S47 of FIG. 20 when the reference image has already been corrected.

As shown in FIG. 22, after the near field wireless communication unit 15 starts to transmit the polling signal, a message 127 instructing the user to touch the portable device 1 to the terminal device 2 is displayed on the display unit 12. In FIG. 22, the displayed message 127 says "Please touch", for example.

Next, as shown in FIG. 23, the user touches the portable device 1 to the vicinity of the target mark 212 formed on the front surface 211 of the terminal device 2 such that the portable device 1 is moved into the position in which near field wireless communication is possible. At the point where near field wireless communication with the terminal device 2 is established, a reference image 128 and a message 129 prompting the user to perform the reference image correction operation are displayed on the display unit 12.

The reference image 128 is a continuous image that connects to the operating buttons and logo marks such as "Wash", "Rinse", and "Dry" formed on the front surface of the terminal device 2 (a washer-drier, for example). In other words, an image showing a part of the target mark formed on the front surface of the terminal device 2 is displayed as the reference image 128. Further, in FIG. 23, the position of the reference image 128 has not been corrected, and therefore the reference image 128 is displayed in the central part of the display unit 12. Furthermore, in FIG. 23, the displayed message 129 says "Align the image with a location where a touch operation will be successful", for example.

Next, as shown in FIG. 24, the operating unit 16 receives a correction operation for aligning the reference image 128 displayed on the display unit 12 with the target mark 212 formed on the front surface 211 of the terminal device 2. When the display unit 12 is a touch panel, the reference image 128 is moved by dragging the displayed reference image 128 to the target position with the finger 214. In FIG. 24, the reference image 128 prior to movement is indicated by dotted lines, and the reference image 128 following movement is indicated by solid lines.

When the reference image has been corrected in this manner, the corrected position correction information is stored in the reference image information storage unit 142. When the reference image has already been corrected, as shown in FIG. 25, a message 129 prompting the user to bring the portable device 1 close to the terminal device 2 may be displayed on the display unit 12. In FIG. 25, for example, the displayed message 129 says "Touch to align the image with the casing". By displaying the message 129 prompting the user to bring the portable device 1 close to the terminal device 2 in this manner, the user can be made aware that correction of the reference image has already been completed.

(Second Embodiment)

Next, a communication system according to a second embodiment of the present invention will be described. In the first embodiment described above, the server 3 includes the averaging unit 33, but in the second embodiment, the portable device 1 includes an averaging unit.

Figure 26:
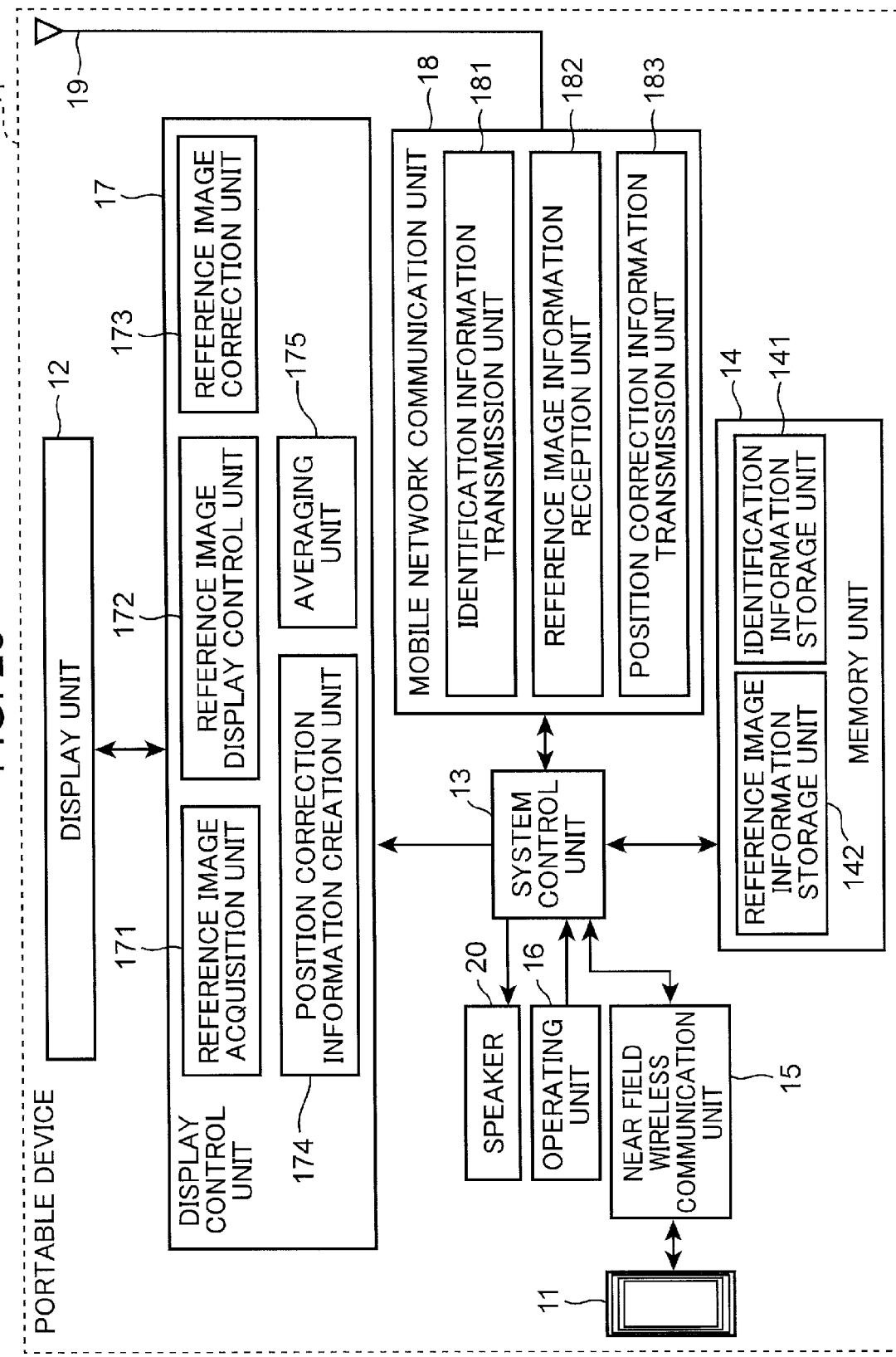
[FIG. 26]

FIG. 26 is a view showing an internal configuration of a portable device according to the second embodiment of the present invention. Note that the communication system according to the second embodiment of the present invention is configured identically to the communication system according to the first embodiment, and therefore description thereof has been omitted.

The portable device 1 shown in FIG. 26 includes the loop antenna 11, the display unit 12, the system control unit 13, the memory unit 14, the near field wireless communication unit 15, the operating unit 16, the display control unit 17, the mobile network communication unit 18, the antenna 19, and the speaker 20. Note that in the portable device according to the second embodiment, identical configurations to those of the portable device according to the first embodiment have been allocated identical reference numerals, and description thereof has been omitted.

The display control unit 17 controls the display unit 12. The display control unit 17 includes the reference image acquisition unit 171, the reference image display control unit 172, the reference image correction unit 173, the position correction information creation unit 174, and an averaging unit 175.

The averaging unit 175 averages the plurality of position correction information created by the position correction information creation unit 174. The averaging unit 175 stores a predetermined number of pieces of position correction information corresponding to identical terminal device product information, and averages the predetermined number of pieces of stored position correction information.

Note that in this embodiment, the averaging unit 175 corresponds to an example of the averaging unit of the communication apparatus.

An operation of the communication system according to the second embodiment is substantially identical to the operation of the communication system according to the first embodiment shown in FIGS. 7 to 9, and therefore only different operations to the first embodiment will be described.

After the position correction information has been created in step S22 of FIG. 9, the averaging unit 175 averages the created position correction information and the stored position correction information corresponding to the same terminal device product information.

Then, in step S23 of FIG. 9, the position correction information transmission unit 183 transmits the position correction information averaged by the averaging unit 175 to the server 3.

By averaging the position correction information in this manner, an error in the correction operation performed by the user can be corrected.

In this embodiment, the server 3 need not include the averaging unit 33. However, the server 3 may include the averaging unit 33.

(Third Embodiment)

Next, a communication system according to a third embodiment of the present invention will be described. In the third embodiment, a marker image indicating a position of an antenna unit provided in the terminal device to transmit and receive the radio waves required for near field wireless communication is displayed on a captured image showing the orientation of the loop antenna so as to be superimposed onto the terminal device within the captured image.

Figure 27:
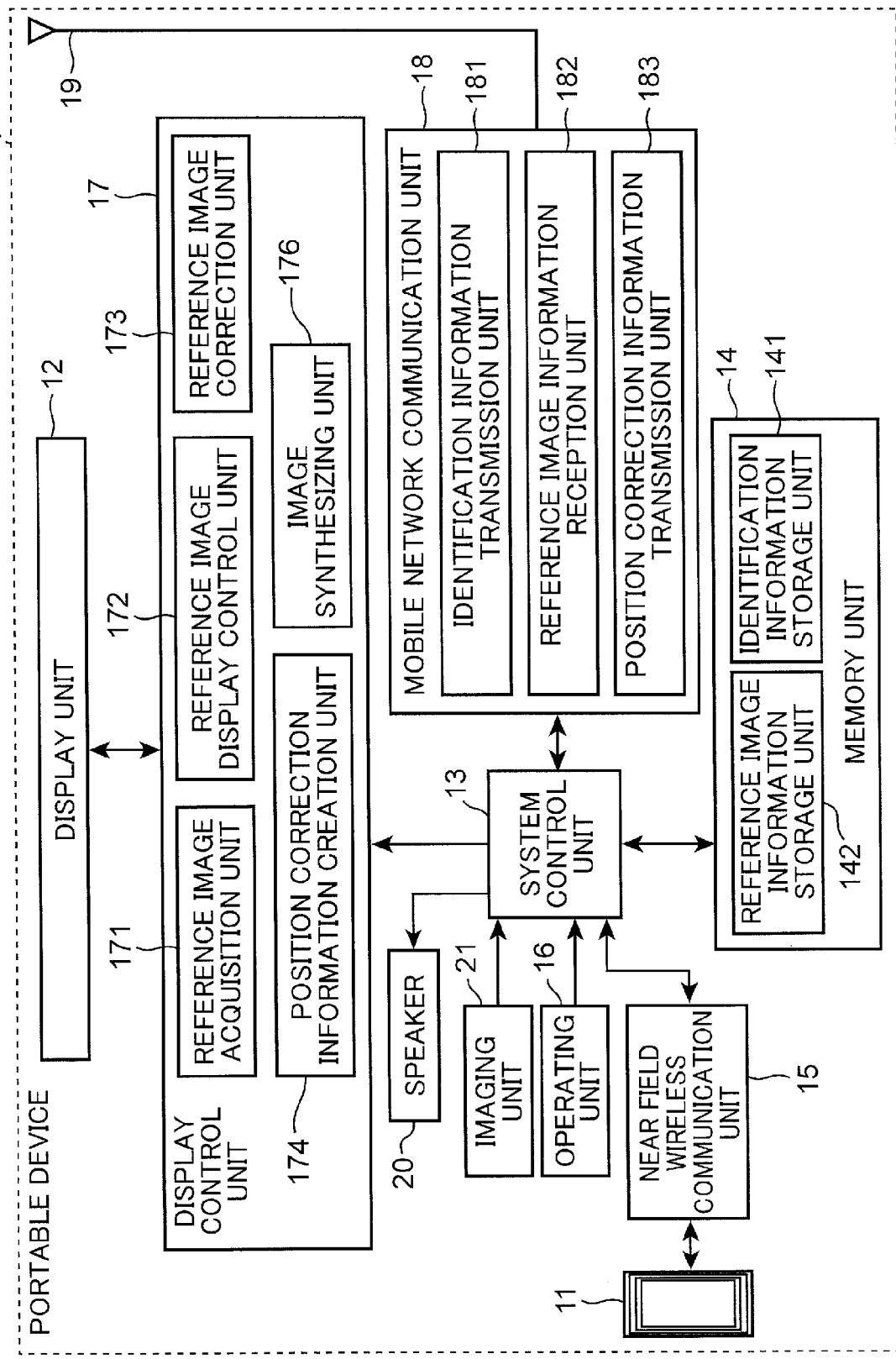
[FIG. 27]

FIG. 27 is a view showing an internal configuration of a portable device according to the third embodiment of the present invention. Note that the communication system according to the third embodiment of the present invention is configured identically to the communication system according to the first embodiment, and therefore description thereof has been omitted.

The portable device 1 shown in FIG. 27 includes the loop antenna 11, the display unit 12, the system control unit 13, the memory unit 14, the near field wireless communication unit 15, the operating unit 16, the display control unit 17, the mobile network communication unit 18, the antenna 19, the speaker 20, and an imaging unit 21. Note that in the portable device according to the third embodiment, identical configurations to those of the portable device according to the first embodiment have been allocated identical reference numerals, and description thereof has been omitted.

The imaging unit 21 is constituted by a CCD (Charge Coupled Device) camera, for example, which obtains an image of the orientation of the loop antenna 11. The imaging unit 21 images the terminal device 2.

The display control unit 17 controls the display unit 12. The display control unit 17 includes the reference image acquisition unit 171, the reference image display control unit 172, the reference image correction unit 173, the position correction information creation unit 174, and an image synthesizing unit 176.

The image synthesizing unit 176 identifies the terminal device 2 within a captured image captured by the imaging unit 21. The image synthesizing unit 176 superimposes the marker image indicating the position of the antenna unit provided in the terminal device 2 to transmit and receive the radio waves required for near field wireless communication onto an image of the terminal device 2 identified within the captured image.

FIG. 28 is a view showing an external configuration of the portable device according to the third embodiment of the present invention. FIG. 28A is a view showing a rear surface of the portable device according to the third embodiment of the present invention, FIG. 28B is a view showing a front surface of the portable device according to the third embodiment of the present invention, and FIG. 28C is a view showing a side face of the portable device according to the third embodiment of the present invention.

As shown in FIGS. 28A to 28C, the display unit 12 is provided on the front surface of the portable device 1. The loop antenna 11 is built into the portable device 1.

The imaging unit 21 is disposed on the rear surface of the portable device 1. In the third embodiment, the imaging unit 21 is disposed in an upper left end portion of the rear surface of the portable device 1, but the present invention is not necessarily limited thereto. The loop antenna 11 is oriented in a direction traveling from the front surface toward the rear surface, which is an opposite direction to the display unit. The orientation of the loop antenna 11 matches an image capturing direction of the imaging unit 21.

The display unit 12 displays the marker image indicating the position of the antenna unit provided in the terminal device 2 to transmit and receive the radio waves required for near field wireless communication so as to be superimposed onto an image obtained by the imaging unit 21. Further, when the portable device 1 and the terminal device 2 are brought close to each other, the display unit 12 displays the reference image for guiding the portable device 1 to the position in which near field wireless communication with the terminal device 2 is possible in place of the image obtained by the imaging unit 21.

Figure 29:
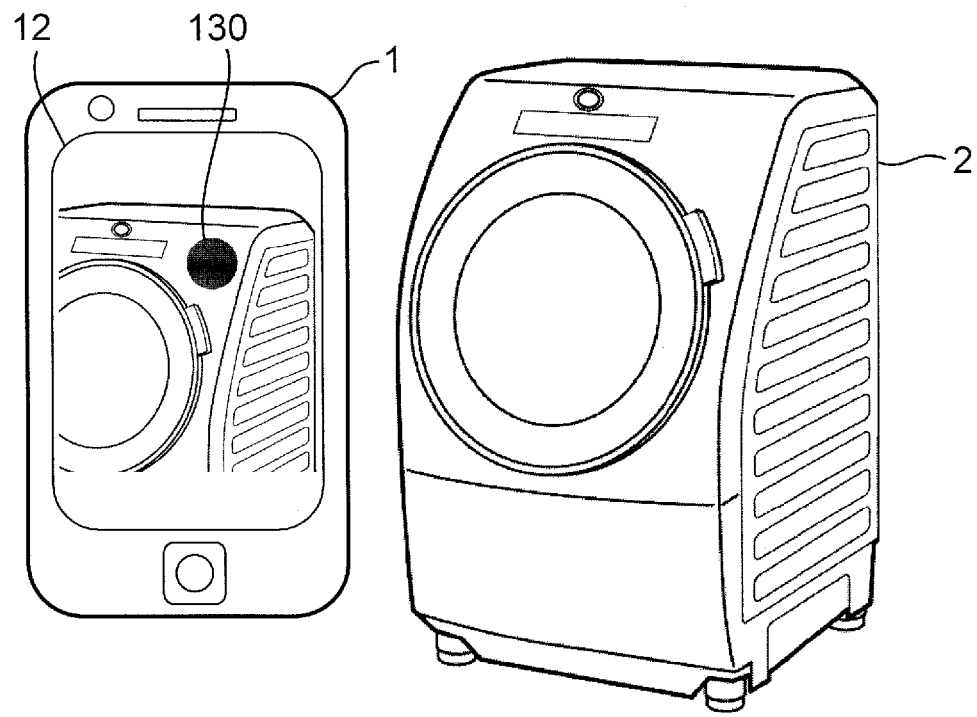
[FIG. 29]
Figure 30:
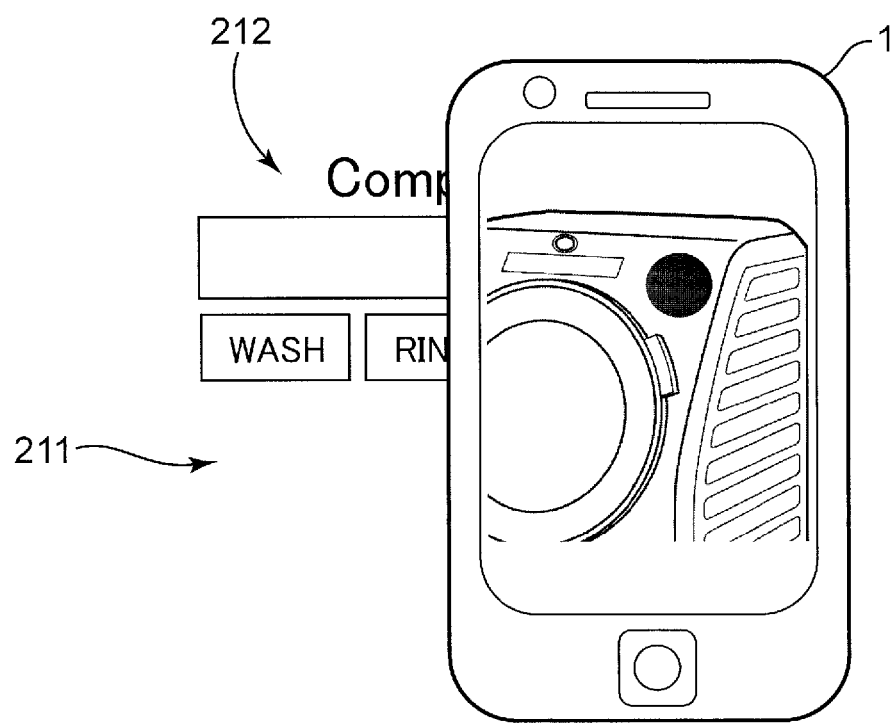
[FIG. 30]
Figure 31:
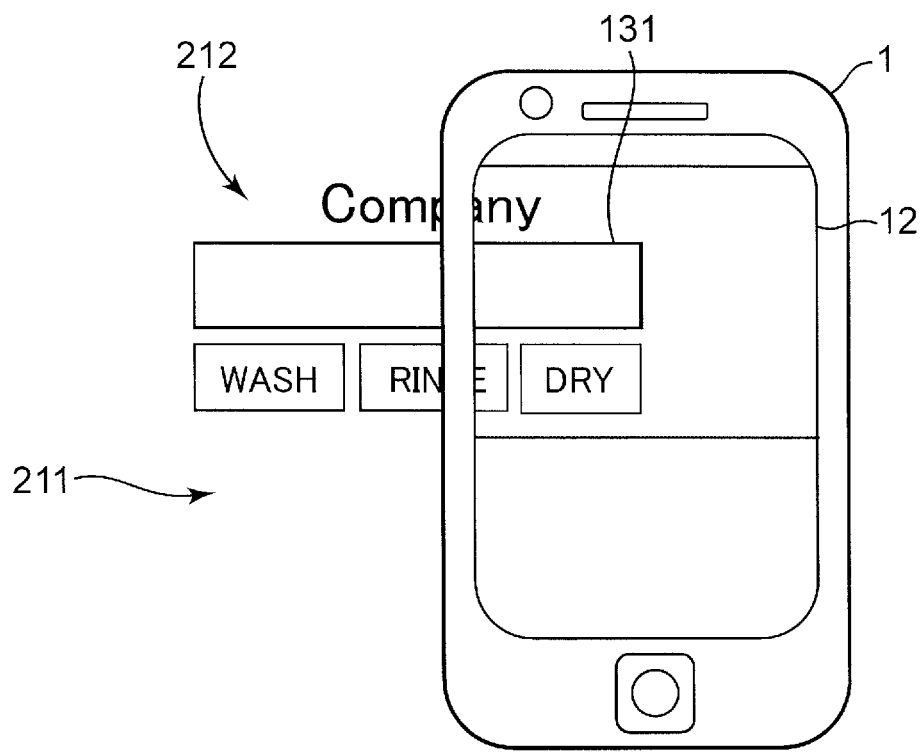
[FIG. 31]

Next, an operation of the communication system according to the third embodiment of the present invention will be described more specifically. FIGS. 29 to 31 are pattern diagrams illustrating the operation of the communication system according to the third embodiment of the present invention specifically.

FIG. 29 is a view showing the terminal device and an example of an image displayed on the display unit of the portable device when the terminal device is imaged. FIG. 30 is a view showing the portable device at the point where near field wireless communication with the terminal device is established. FIG. 31 is a view illustrating the reference image correction operation performed by the user.

Using an existing image recognition technique, the image synthesizing unit 176 identifies the terminal device 2 from the image captured by the imaging unit 21. For example, an image showing all or a part of the terminal device 2 is stored in the memory unit 14. The image synthesizing unit 176 identifies the terminal device 2 from the image captured by the imaging unit 21 using the image showing all or a part of the terminal device 2 stored in the memory unit 14.

Further, using an existing augmented reality display technique, the image synthesizing unit 176 superimposes the marker image indicating the position of the antenna unit provided in the terminal device 2 to transmit and receive the radio waves required for near field wireless communication onto the image of the terminal device 2 identified within the captured image. For example, antenna position information indicating the position of the antenna unit provided in the terminal device 2 to transmit and receive the radio waves required for near field wireless communication and the marker image indicating the position of the antenna unit are stored in the memory unit 14. The image synthesizing unit 176 specifies the position of the antenna unit on the image of the terminal device 2 identified within the captured image on the basis of the antenna position information, and superimposes the marker image on the specified position of the antenna unit.

Hence, as shown in FIG. 29, an image in which a marker image 130 is superimposed onto an image of the terminal device 2 in the position of the antenna unit on the image of the terminal device 2 is displayed on the display unit 12.

The image synthesizing unit 176 always displays the marker image 130 so as to be superimposed in a predetermined position of the captured image of the terminal device 2 displayed on the display unit 12, or in other words in the position of the antenna unit of the terminal device 2. Therefore, the terminal device 2 and the marker image 130 indicating the position of the antenna unit of the terminal device 2 are displayed on the display unit 12 even when the portable device 1 is brought close to the terminal device 2.

When a distance between the portable device 1 and the terminal device 2 has reached a predetermined distance, the reference image display control unit 172 switches the captured image displayed on the display unit 12 to the reference image. Note that the determination as to whether or not the distance between the portable device 1 and the terminal device 2 has reached the predetermined distance is made in accordance with a size of the terminal device 2 within the captured image, for example. When the portable device 1 is brought close to the terminal device 2 such that the terminal device 2 reaches a predetermined size within the captured image, the distance between the portable device 1 and the terminal device 2 is determined to have reached the predetermined distance. Alternatively, the distance between the portable device 1 and the terminal device 2 is determined to have reached the predetermined distance when the portable device 1 comes into contact with the terminal device 2 such that the captured image can no longer be obtained (the screen turns black).

Next, as shown in FIG. 30, the user touches the portable device 1 to the vicinity of the target mark 212 formed on the front surface 211 of the terminal device 2 such that the portable device 1 is moved into the position in which near field wireless communication is possible. At the point where near field wireless communication with the terminal device 2 is established, a message prompting the user to perform the reference image correction operation is displayed on the display unit 12.

Next, as shown in FIG. 31, the operating unit 16 receives a correction operation for aligning a reference image 131 displayed on the display unit 12 with the target mark 212 formed on the front surface 211 of the terminal device 2. When the display unit 12 is a touch panel, the reference image 131 is moved by dragging the displayed reference image 131 to a target position with a finger.

When the reference image has been corrected as described above, the corrected position correction information is stored in the reference image information storage unit 142.

When the position of the antenna unit of the terminal device 2 is displayed on the display unit 12 in this manner, a mark indicating the position of the antenna unit need not be provided on the front surface of the terminal device 2. As a result, the user can be notified of the position of the antenna unit of the terminal device 2 without spoiling the design of the terminal device 2.

In the third embodiment, the display control unit 17 of the portable device 1 may include the averaging unit 175 according to the second embodiment.

Further, in the third embodiment, an image of the terminal device 2 captured by the imaging unit 21 is displayed. However, the present invention is not necessarily limited thereto, and instead, the portable device 1 may store a terminal device image on which the position of the antenna unit of the terminal device 2 can be specified in advance, and display the terminal device image prior to display of the reference image. The terminal device image may be a photographed image of the exterior of the terminal device 2 or a CG (Computer Graphics) image showing the exterior of the terminal device 2, for example. The portable device 1 identifies the terminal device 2 from the image of the terminal device 2 captured by the imaging unit 21 using image recognition, and obtains the terminal device image corresponding to the identified terminal device 2 from the memory unit 14 or the server 3.

In the first to third embodiments, the reference image information includes the reference image and the position correction information, but may also include the corrected image.

Note that the uncorrected reference image may be displayed on the display unit and corrected even when the corrected reference image information is stored in the portable device. For example, an application that causes the user to perform image correction using a game in order to obtain a plurality of image correction information generated by the user may be provided.

(Fourth Embodiment)

Next, a communication system according to a fourth embodiment of the present invention will be described. In the fourth embodiment, an application program is transmitted from the server apparatus to the portable device.

Figure 32:
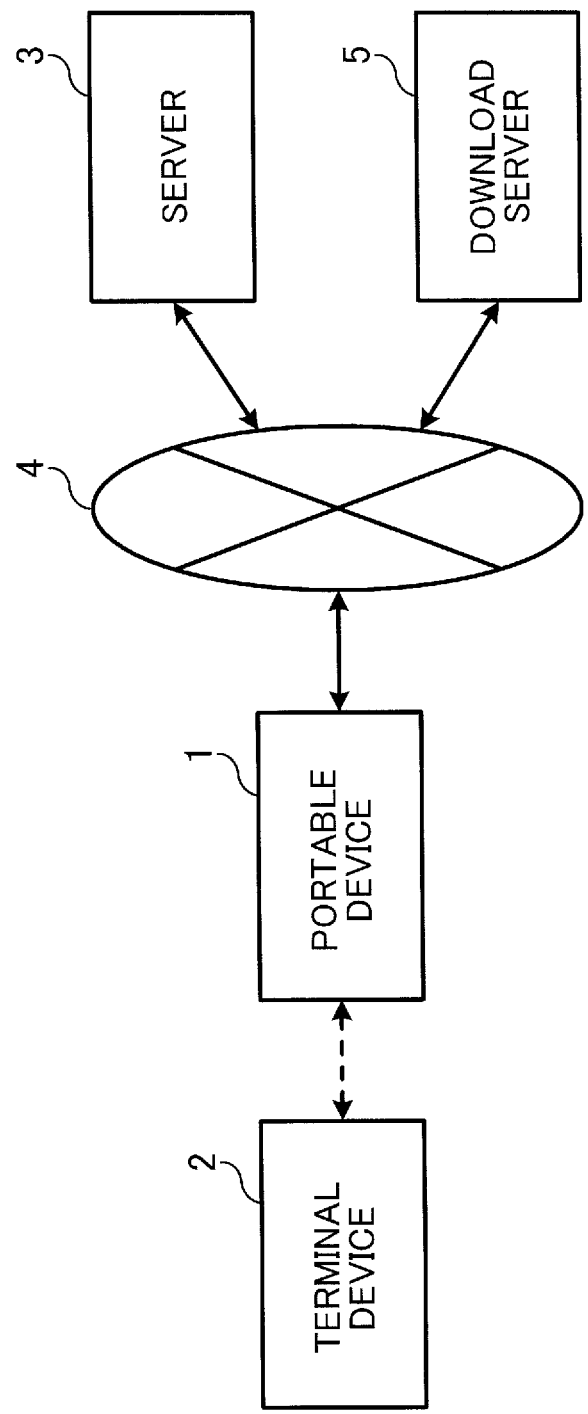
[FIG. 32]

FIG. 32 is a view showing a configuration of the communication system according to the fourth embodiment of the present invention. The communication system shown in FIG. 32 includes the portable device 1, the terminal device 2, the server 3, and a download server 5. Note that the portable device 1, the terminal device 2, and the server 3 according to the fourth embodiment of the present invention are configured identically to the portable device 1, the terminal device 2, and the server 3 according to the first to third embodiments, and therefore detailed description thereof has been omitted.

The portable device 1 is connected communicably to the server 3 and the download server 5 via the network 4.

The download server 5 is constituted by a known server computer or the like, and is connected to the portable device 1 communicably via the network 4. The download server 5 transmits an application program to the portable device 1, which communicates with an external apparatus using near field wireless communication, via the network 4.

Figure 33:
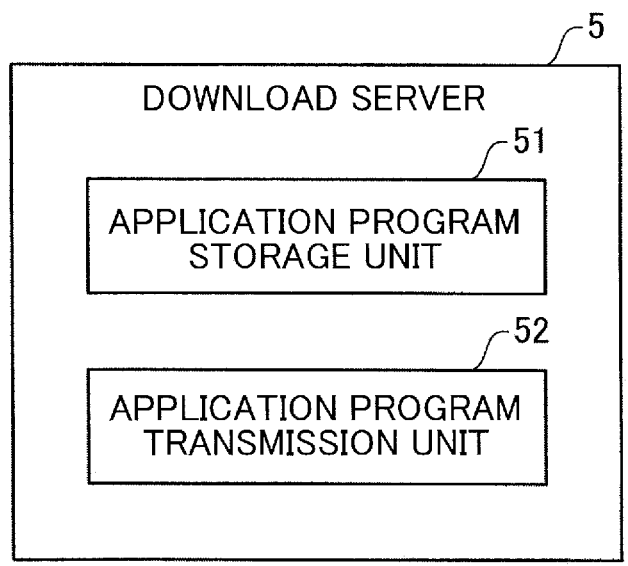
[FIG. 33]

FIG. 33 is a view showing a configuration of the download server according to the fourth embodiment of the present invention. The download server 5 includes an application program storage unit 51 and an application program transmission unit 52.

The application program storage unit 51 stores an application program that is executed by the portable device 1. The application program transmission unit 52 transmits the application program stored in the application program storage unit 51 to the portable device 1. More specifically, the application program transmission unit 52 receives an application program transmission request from the portable device 1, reads the application program corresponding to the received transmission request from the application program storage unit 51, and transmits the read application program to the portable device 1.

The application program is a program that causes the portable device 1 to function as a portable device 1 that obtains the image information including the reference image for guiding the portable device 1 to the position in which near field wireless communication with the terminal device 2 is possible on the basis of the portable device identification information for identifying the type of the portable device 1, displays the reference image on the display unit 12, which is provided in the portable device 1 on the opposite surface to the surface that opposes the terminal device 2 when the portable device 1 is brought close to the terminal device 2, on the basis of the obtained image information, and corrects the display position of the reference image in response to the image moving operation for aligning the position of the reference image displayed on the display unit 12 with the position of the target mark formed on the front surface of the terminal device 2.

The portable device 1 receives the application program transmitted by the download server 5, and stores the received application program in the memory unit 14. The system control unit 13 of the portable device 1 executes the application program stored in the memory unit 14.

The application program is also a program for causing the portable device 1 to function as a portable device 1 that creates the first correction information indicating the display position of the corrected reference image, and stores the created first correction information in association with the reference image.

The application program is also a program for causing the portable device 1 to function as a portable device 1 that creates the first correction information indicating the display position of the corrected reference image, and transmits the created first correction information.

Furthermore, the application program is a program for causing the portable device 1 to function as a portable device 1 that displays the reference image in the display position indicated by the second correction information, which is included in the image information and indicates the display position of the reference image.

Moreover, the application program is a program for causing the portable device 1 to function as a portable device 1 that obtains image information including the reference image defined on the basis of the portable device identification information and the terminal device identification information for identifying the terminal device 2.

The application program is also a program for causing the portable device 1 to function as a portable device 1 that creates a plurality of the first correction information and averages the created plurality of the first correction information.

Furthermore, the application program is a program for causing the portable device 1 to function as a portable device 1 that images the terminal device 2 using the imaging unit 21 provided in the portable device 1, identifies the terminal device 2 in the captured image, and superimposes the marker image indicating the position of the antenna unit provided in the terminal device 2 to transmit and receive the radio waves required for near field wireless communication onto the image of the terminal device 2 identified within the captured image.

In the fourth embodiment, the server 3 and the download server 5 are provided separately. However, the present invention is not necessarily limited thereto, and the server 3 may include the functions of the download server 5 such that the application program is transmitted to the portable device 1 by the server 3.

The download server 5 may be constituted by a plurality of server computers or the like. For example, the application program may be constituted by a plurality of programs, and different servers may be used to transmit a part of the plurality of programs and the other programs.

The specific embodiments described above mainly include inventions having following configurations.

A communication apparatus according to one aspect of the present invention communicates with an external apparatus using near field wireless communication, and includes: an antenna unit that transmits and receives radio waves required for the near field wireless communication; a display unit provided on an opposite surface to a surface that opposes the external apparatus when the communication apparatus is brought close to the external apparatus; a reference image acquisition unit that obtains a reference image for guiding the communication apparatus to a position in which the near field wireless communication with the external apparatus is possible on the basis of communication apparatus identification information for identifying a type of the communication apparatus; a reference image display control unit that displays the reference image obtained by the reference image acquisition unit on the display unit; and a reference image correction unit that corrects a position of the reference image in response to an image moving operation for aligning the reference image displayed on the display unit with a target mark formed on a front surface of the external apparatus.

According to this configuration, the antenna unit transmits and receives the radio waves required for near field wireless communication. The display unit is provided on the opposite surface of the communication apparatus to the surface that opposes the external apparatus when the communication apparatus is brought close to the external apparatus. The reference image acquisition unit obtains the reference image for guiding the communication apparatus to the position in which near field wireless communication with the external apparatus is possible on the basis of the communication apparatus identification information for identifying the type of the communication apparatus. The reference image display control unit displays the reference image obtained by the reference image acquisition unit on the display unit. The reference image correction unit corrects the position of the reference image in response to the image moving operation for aligning the reference image displayed on the display unit with the target mark formed on the front surface of the external apparatus.

Hence, the reference image for guiding the communication apparatus to the position in which near field wireless communication with the external apparatus is possible is displayed, and the position of the reference image is corrected in response to the image moving operation for aligning the reference image displayed on the display unit with the target mark formed on the front surface of the external apparatus. As a result, an antenna of the communication apparatus and an antenna of an external device can be positioned accurately using the corrected reference image.

The communication apparatus preferably further includes: a position correction information creation unit that creates position correction information indicating the position of the reference image corrected by the reference image correction unit; and a reference image storage unit that stores the position correction information created by the position correction information creation unit in association with the reference image.

According to this configuration, the position correction information creation unit creates the position correction information indicating the position of the reference image corrected by the reference image correction unit, and the reference image storage unit stores the position correction information created by the position correction information creation unit in association with the reference image.

Hence, the position correction information indicating the position of the corrected reference image is stored in association with the reference image, and therefore the reference image can be displayed correctly on the basis of the stored position correction information. Further, since the reference image is displayed correctly on the basis of the stored position correction information, a processing time required to correct the reference image can be shortened.

The communication apparatus preferably further includes: a position correction information creation unit that creates position correction information indicating the position of the reference image corrected by the reference image correction unit; and a position correction information transmission unit that transmits the position correction information created by the position correction information creation unit in association with the communication apparatus identification information.

According to this configuration, the position correction information creation unit creates the position correction information indicating the position of the reference image corrected by the reference image correction unit, and the position correction information transmission unit transmits the position correction information created by the position correction information creation unit in association with the communication apparatus identification information.

Hence, the position correction information indicating the position of the corrected reference image is transmitted in association with the communication apparatus identification information, and therefore, by transmitting the position correction information to a server apparatus, the position correction information can be transmitted from the server apparatus to another communication apparatus. As a result, the corrected reference image can be displayed in an appropriate position likewise in the other communication apparatus.

Furthermore, in the communication apparatus, the reference image acquisition unit preferably further obtains position correction information indicating a position of the corrected reference image as well as the reference image, and the reference image correction unit preferably corrects the reference image obtained by the reference image acquisition unit on the basis of the position correction information obtained by the reference image acquisition unit.

According to this configuration, the reference image acquisition unit also obtains the position correction information indicating the position of the corrected reference image as well as the reference image, and the reference image correction unit corrects the reference image obtained by the reference image acquisition unit on the basis of the position correction information obtained by the reference image acquisition unit.

Hence, the obtained reference image is corrected on the basis of the obtained position correction information, and therefore the processing time required to correct the reference image can be shortened. Moreover, by obtaining position correction information created by another communication apparatus, the reference image can be displayed correctly using the position correction information created by the other communication apparatus.

Furthermore, in the communication apparatus, the reference image acquisition unit preferably obtains the reference image on the basis of the communication apparatus identification information and external apparatus identification information for identifying the external apparatus.

According to this configuration, the reference image is obtained on the basis of the communication apparatus identification information and the external apparatus identification information for identifying the external apparatus, and therefore a reference image corresponding to a type of the external apparatus can be displayed.

Further, in the communication apparatus, the position correction information creation unit preferably creates a plurality of the position correction information, and the communication apparatus preferably further includes an averaging unit that averages the plurality of position correction information created by the position correction information creation unit.

According to this configuration, the position correction information creation unit creates a plurality of the position correction information, and the averaging unit averages the plurality of position correction information created by the position correction information creation unit.

Hence, the plurality of created position correction information is averaged, and therefore a precision of the position correction information can be improved.

The communication apparatus preferably further includes: an imaging unit that images the external apparatus; and an image synthesizing unit that identifies the external apparatus in a captured image obtained by the imaging unit, and superimposes a marker image indicating a position of an antenna unit provided in the external apparatus to transmit and receive the radio waves required for near field wireless communication onto an image of the external apparatus identified within the captured image.

According to this configuration, the imaging unit images the external apparatus, while the image synthesizing unit identifies the external apparatus in the captured image obtained by the imaging unit, and superimposes the marker image indicating the position of the antenna unit provided in the external apparatus to transmit and receive the radio waves required for near field wireless communication onto the image of the external apparatus identified within the captured image.

Hence, the marker image indicating the position of the antenna unit provided in the external apparatus to transmit and receive the radio waves required for near field wireless communication is displayed so as to be superimposed on the image of the external apparatus identified within the captured image. As a result, the need to provide a mark indicating the position of the antenna unit on the front surface of the external apparatus is eliminated, and therefore the user can be notified of the position of the antenna unit on the external apparatus without spoiling the design of the external apparatus.

A communication method according to another aspect of the present invention is a method of communicating with an external apparatus using near field wireless communication, and includes: a reference image acquisition step of obtaining a reference image for guiding a communication apparatus to a position in which the near field wireless communication with the external apparatus is possible on the basis of communication apparatus identification information for identifying a type of the communication apparatus; a reference image display control step of displaying the reference image obtained in the reference image acquisition step on a display unit provided on an opposite surface of the communication apparatus to a surface that opposes the external apparatus when the communication apparatus is brought close to the external apparatus; and a reference image correction step of correcting a position of the reference image in response to an image moving operation for aligning the reference image displayed on the display unit with a target mark formed on a front surface of the external apparatus.

According to this configuration, in the reference image acquisition step, the reference image for guiding the communication apparatus to the position in which the near field wireless communication with the external apparatus is possible is obtained on the basis of the communication apparatus identification information for identifying the type of the communication apparatus. Next, in the reference image display control step, the obtained reference image is displayed on the display unit provided on the opposite surface of the communication apparatus to the surface that opposes the external apparatus when the communication apparatus is brought close to the external apparatus. Next, in the reference image correction step, the position of the reference image is corrected in response to the image moving operation for aligning the reference image displayed on the display unit with the target mark formed on the front surface of the external apparatus.

Hence, the reference image for guiding the communication apparatus to the position in which near field wireless communication with the external apparatus is possible is displayed, and the position of the reference image is corrected in response to the image moving operation for aligning the reference image displayed on the display unit with the target mark formed on the front surface of the external apparatus. As a result, the antenna of the communication apparatus and the antenna of the external device can be positioned accurately using the corrected reference image.

A communication program according to a further aspect of the present invention is a program for communicating with an external apparatus using near field wireless communication, which causes a computer to function as: a reference image acquisition unit that obtains a reference image for guiding a communication apparatus to a position in which the near field wireless communication with the external apparatus is possible on the basis of communication apparatus identification information for identifying a type of the communication apparatus; a reference image display control unit that displays the reference image obtained by the reference image acquisition unit on a display unit provided on an opposite surface of the communication apparatus to a surface that opposes the external apparatus when the communication apparatus is brought close to the external apparatus; and a reference image correction unit that corrects a position of the reference image in response to an image moving operation for aligning the reference image displayed on the display unit with a target mark formed on a front surface of the external apparatus.

According to this configuration, the reference image acquisition unit obtains the reference image for guiding the communication apparatus to the position in which the near field wireless communication with the external apparatus is possible on the basis of the communication apparatus identification information for identifying the type of the communication apparatus. The reference image display control unit displays the reference image obtained by the reference image acquisition unit on the display unit provided on the opposite surface of the communication apparatus to the surface that opposes the external apparatus when the communication apparatus is brought close to the external apparatus. The reference image correction unit corrects the position of the reference image in response to the image moving operation for aligning the reference image displayed on the display unit with the target mark formed on the front surface of the external apparatus.

Hence, the reference image for guiding the communication apparatus to the position in which near field wireless communication with the external apparatus is possible is displayed, and the position of the reference image is corrected in response to the image moving operation for aligning the reference image displayed on the display unit with the target mark fanned on the front surface of the external apparatus. As a result, the antenna of the communication apparatus and the antenna of the external device can be positioned accurately using the corrected reference image.

A server apparatus according to a further aspect of the present invention transmits a program via a network to a communication apparatus that communicates with an external apparatus using near field wireless communication, wherein the program causes the communication apparatus to function as a communication apparatus which: obtains image information including a reference image for guiding the communication apparatus to a position in which the near field wireless communication with the external apparatus is possible on the basis of communication apparatus identification information for identifying a type of the communication apparatus; displays the reference image on a display unit of the communication apparatus, which is provided on an opposite surface of the communication apparatus to a surface that opposes the external apparatus when the communication apparatus is brought close to the external apparatus, on the basis of the obtained image information; and corrects a display position of the reference image in response to an image moving operation for aligning a position of the reference image displayed on the display unit with a position of a target mark formed on a front surface of the external apparatus.

According to this configuration, the communication apparatus obtains the image information including the reference image for guiding the communication apparatus to the position in which near field wireless communication with the external apparatus is possible on the basis of the communication apparatus identification information for identifying the type of the communication apparatus, displays the reference image on the display unit of the communication apparatus, which is provided on the opposite surface to the surface that opposes the external apparatus when the communication apparatus is brought close to the external apparatus, on the basis of the obtained image information, and corrects the display position of the reference image in response to the image moving operation for aligning the position of the reference image displayed on the display unit with the position of the target mark formed on the front surface of the external apparatus.

Hence, the reference image for guiding the communication apparatus to the position in which near field wireless communication with the external apparatus is possible is displayed, and the display position of the reference image is corrected in response to the image moving operation for aligning the position of the reference image displayed on the display unit with the position of the target mark formed on the front surface of the external apparatus. As a result, the antenna of the communication apparatus and the antenna of the external device can be positioned accurately using the corrected reference image.

In the server apparatus, the program preferably further causes the communication apparatus to function as a communication apparatus which: creates first correction information indicating the corrected display position of the reference image; and stores the created first correction information in association with the reference image.

According to this configuration, the first correction information indicating the corrected display position of the reference image is stored in association with the reference image, and therefore the reference image can be displayed correctly on the basis of the stored first correction information. Further, since the reference image is displayed correctly on the basis of the stored first correction information, the processing time required to correct the reference image can be shortened.

Moreover, in the server apparatus, the program preferably further causes the communication apparatus to function as a communication apparatus which: creates first correction information indicating the corrected display position of the reference image; and transmits the created first correction information.

According to this configuration, the first correction information indicating the corrected display position of the reference image is transmitted, and therefore, by transmitting the first correction information to the server apparatus, the first correction information can be transmitted to another communication apparatus from the server apparatus. As a result, the corrected reference image can be displayed in an appropriate position likewise in the other communication apparatus.

Moreover, in the server apparatus, the program preferably further causes the communication apparatus to function as a communication apparatus which displays the reference image in a display position indicated by second correction information, which is included in the image information and indicates the display position of the reference image.

According to this configuration, the reference image is displayed in the display position indicated by the second correction information, which is included in the image information and indicates the display position of the reference image, and therefore the processing time required to correct the reference image can be shortened. Furthermore, by obtaining second correction information created by another communication apparatus, the reference image can be displayed correctly using the second correction information created by the other communication apparatus.

Moreover, in the server apparatus, the program preferably further causes the communication apparatus to function as a communication apparatus which obtains image information including a reference image defined on the basis of the communication apparatus identification information and external apparatus identification information for identifying the external apparatus.

According to this configuration, the image information including the reference image defined on the basis of the communication apparatus identification information and the external apparatus identification information for identifying the external apparatus is obtained, and therefore a reference image corresponding to the type of the external apparatus can be displayed.

Moreover, in the server apparatus, the program preferably further causes the communication apparatus to function as a communication apparatus which: creates a plurality of the first correction information; and averages the created plurality of the first correction information.

According to this configuration, the created plurality of first correction information is averaged, and therefore the precision of the first correction information can be improved.

Moreover, in the server apparatus, the program preferably further causes the communication apparatus to function as a communication apparatus which: images the external apparatus using an imaging unit provided in the communication apparatus; identifies the external apparatus in a captured image; and superimposes a marker image indicating a position of an antenna unit provided in the external apparatus to transmit and receive radio waves required for the near field wireless communication onto an image of the external apparatus identified within the captured image.

According to this configuration, the marker image indicating the position of the antenna unit provided in the external apparatus to transmit and receive the radio waves required for near field wireless communication is displayed so as to be superimposed onto the image of the external apparatus identified within the captured image. As a result, the need to provide a mark indicating the position of the antenna unit on the front surface of the external apparatus is eliminated, and therefore the user can be notified of the position of the antenna unit on the external apparatus without spoiling the design of the external apparatus.

A server apparatus according to a further aspect of the present invention is connected via a network to a communication apparatus that communicates with an external apparatus using near field wireless communication, and includes: a reference image storage unit that stores, in association, communication apparatus identification information for identifying a type of the communication apparatus, a reference image for guiding the communication apparatus to a position in which the near field wireless communication with the external apparatus is possible, and position correction information indicating a corrected position of the reference image; a communication apparatus identification information reception unit that receives the communication apparatus identification information from the communication apparatus; a reference image transmission unit that selects the reference image from the reference image storage unit on the basis of the communication apparatus identification information received by the communication apparatus identification information reception unit, and transmits the selected reference image to the communication apparatus; and a position correction information reception unit that receives the position correction information from the communication apparatus, and updates the position correction information stored in the reference image storage unit to the received position correction information.

According to this configuration, the reference image storage unit stores, in association, the communication apparatus identification information for identifying the type of the communication apparatus, the reference image for guiding the communication apparatus to the position in which near field wireless communication with the external apparatus is possible, and the position correction information indicating the corrected position of the reference image. The communication apparatus identification information reception unit receives the communication apparatus identification information from the communication apparatus. The reference image transmission unit selects the reference image from the reference image storage unit on the basis of the communication apparatus identification information received by the communication apparatus identification information reception unit, and transmits the selected reference image to the communication apparatus. The position correction information reception unit receives the position correction information from the communication apparatus, and updates the position correction information stored in the reference image storage unit to the received position correction information.

Hence, the position correction information is received from the communication apparatus, and the position correction information stored in the reference image storage unit is updated to the received position correction information. As a result, the position correction information indicating the corrected position of the reference image can be obtained from the communication apparatus, whereupon the position correction information can be provided to another communication apparatus.

In the server apparatus, the position correction information reception unit preferably receives a plurality of the position correction information corresponding to the communication apparatus identification information, and the server apparatus preferably further includes an averaging unit that averages the plurality of the position correction information corresponding to the communication apparatus identification information received by the position correction information reception unit.

According to this configuration, the position correction information reception unit receives the plurality of position correction information corresponding to the communication apparatus identification information, and the averaging unit averages the plurality of position correction information corresponding to the communication apparatus identification information received by the position correction information reception unit.

Hence, the plurality of received position correction information corresponding to the communication apparatus identification information is averaged, and therefore the precision of the position correction information can be improved.

A communication method according to a further aspect of the present invention is executed by a server apparatus that is connected via a network to a communication apparatus that communicates with an external apparatus using near field wireless communication, and includes: receiving communication apparatus identification information for identifying a type of the communication apparatus from the communication apparatus; transmitting a reference image for guiding the communication apparatus to a position in which the near field wireless communication with the external apparatus is possible, the reference image being stored in a storage unit in association with the received communication apparatus identification information, to the communication apparatus; receiving first correction information for correcting a display position in which the transmitted reference image is displayed from the communication apparatus; and updating, on the basis of the received first correction information, second correction information that indicates the corrected position of the reference image and is stored in the storage unit in association with the received communication apparatus identification information.

According to this configuration, the communication apparatus identification information for identifying the type of the communication apparatus is received from the communication apparatus. The reference image for guiding the communication apparatus to the position in which near field wireless communication with the external apparatus is possible, which is stored in the storage unit in association with the received communication apparatus identification information, is transmitted to the communication apparatus. The first correction information for correcting the display position in which the transmitted reference image is displayed is received from the communication apparatus. The second correction information that indicates the corrected position of the reference image and is stored in the storage unit in association with the received communication apparatus identification information is updated on the basis of the received first correction information.

Hence, the first correction information is received from the communication apparatus, and the second correction information that indicates the corrected position of the reference image and is stored in the storage unit is updated on the basis of the received first correction information. As a result, the first correction information indicating the corrected position of the reference image can be obtained from the communication apparatus, whereupon the second correction information can be provided to another communication apparatus.

The communication method preferably further includes transmitting the second correction information stored in association with the received communication apparatus identification information to the communication apparatus.

According to this configuration, the second correction information stored in association with the received communication apparatus identification information is transmitted to the communication apparatus, and therefore the second correction information can be provided to the communication apparatus.

The communication method preferably further includes: receiving external apparatus identification information for identifying the external apparatus from the communication apparatus; and transmitting the reference image stored in association with the received communication apparatus identification information to the communication apparatus on the basis of the received external apparatus identification information.

According to this configuration, the external apparatus identification information for identifying the external apparatus is received from the communication apparatus, and the reference image stored in association with the received communication apparatus identification information is transmitted to the communication apparatus on the basis of the received external apparatus identification information.

Hence, the reference image stored in association with the received communication apparatus identification information is transmitted to the communication apparatus on the basis of the external apparatus identification information, and therefore the communication apparatus can display a reference image that corresponds to the type of the external apparatus.

An information updating method for a server apparatus according to a further aspect of the present invention is an information updating method for a server apparatus connected via a network to a communication apparatus that communicates with an external apparatus using near field wireless communication, and includes: a reference image storage step of storing communication apparatus identification information for identifying a type of the communication apparatus, a reference image for guiding the communication apparatus to a position in which the near field wireless communication with the external apparatus is possible, and position correction information indicating a corrected position of the reference image, in association with each other in a reference image storage unit; a communication apparatus identification information reception step of receiving the communication apparatus identification information from the communication apparatus; a reference image transmission step of selecting the reference image from the reference image storage unit on the basis of the communication apparatus identification information received in the communication apparatus identification information reception step, and transmitting the selected reference image to the communication apparatus; and a position correction information updating step of receiving the position correction information from the communication apparatus and updating the position correction information stored in the reference image storage unit to the received position correction information.

According to this configuration, in the reference image storage step, the communication apparatus identification information for identifying the type of the communication apparatus, the reference image for guiding the communication apparatus to the position in which near field wireless communication with the external apparatus is possible, and the position correction information indicating the corrected position of the reference image are stored in association with each other in the reference image storage unit. Next, in the communication apparatus identification information reception step, the communication apparatus identification information is received from the communication apparatus. Next, in the reference image transmission step, the reference image is selected from the reference image storage unit on the basis of the communication apparatus identification information received in the communication apparatus identification information reception step, and the selected reference image is transmitted to the communication apparatus. Next, in the position correction information updating step, the position correction information is received from the communication apparatus, and the position correction information stored in the reference image storage unit is updated to the received position correction information.

Hence, the position correction information is received from the communication apparatus, and the position correction information stored in the reference image storage unit is updated to the received position correction information. As a result, the position correction information indicating the corrected position of the reference image can be obtained from the communication apparatus, whereupon the position correction information can be provided to another communication apparatus.

A communication system according to a further aspect of the present invention includes a communication apparatus that communicates with an external apparatus using near field wireless communication, and a server apparatus connected to the communication apparatus via a network, wherein the communication apparatus includes: an antenna unit that transmits and receives radio waves required for the near field wireless communication; a display unit provided on an opposite surface to a surface that opposes the external apparatus when the communication apparatus is brought close to the external apparatus; a reference image acquisition unit that obtains a reference image for guiding the communication apparatus to a position in which the near field wireless communication with the external apparatus is possible on the basis of communication apparatus identification information for identifying a type of the communication apparatus; a reference image display control unit that displays the reference image obtained by the reference image acquisition unit on the display unit; and a reference image correction unit that corrects a position of the reference image in response to an image moving operation for aligning the reference image displayed on the display unit with a target mark formed on a front surface of the external apparatus, and the server apparatus includes: a reference image storage unit that stores, in association, the communication apparatus identification information for identifying the type of the communication apparatus, the reference image for guiding the communication apparatus to the position in which the near field wireless communication with the external apparatus is possible, and position correction information indicating the corrected position of the reference image; a communication apparatus identification information reception unit that receives the communication apparatus identification information from the communication apparatus; a reference image transmission unit that selects the reference image from the reference image storage unit on the basis of the communication apparatus identification information received by the communication apparatus identification information reception unit, and transmits the selected reference image to the communication apparatus; and a position correction information reception unit that receives the position correction information from the communication apparatus, and updates the position correction information stored in the reference image storage unit to the received position correction information.

According to this configuration, the antenna unit of the communication apparatus transmits and receives the radio waves required for near field wireless communication. The display unit is provided on the opposite surface of the communication apparatus to the surface that opposes the external apparatus when the communication apparatus is brought close to the external apparatus. The reference image acquisition unit obtains the reference image for guiding the communication apparatus to the position in which near field wireless communication with the external apparatus is possible on the basis of the communication apparatus identification information for identifying the type of the communication apparatus. The reference image display control unit displays the reference image obtained by the reference image acquisition unit on the display unit. The reference image correction unit corrects the position of the reference image in response to the image moving operation for aligning the reference image displayed on the display unit with the target mark formed on the front surface of the external apparatus. The reference image storage unit of the server apparatus stores, in association, the communication apparatus identification information for identifying the type of the communication apparatus, the reference image for guiding the communication apparatus to the position in which near field wireless communication with the external apparatus is possible, and the position correction information indicating the corrected position of the reference image. The communication apparatus identification information reception unit receives the communication apparatus identification information from the communication apparatus. The reference image transmission unit selects the reference image from the reference image storage unit on the basis of the communication apparatus identification information received by the communication apparatus identification information reception unit, and transmits the selected reference image to the communication apparatus. The position correction information reception unit receives the position correction information from the communication apparatus, and updates the position correction information stored in the reference image storage unit to the received position correction information.

Hence, the reference image for guiding the communication apparatus to the position in which near field wireless communication with the external apparatus is possible is displayed, and the position of the reference image is corrected in response to the image moving operation for aligning the reference image displayed on the display unit with the target mark formed on the front surface of the external apparatus. As a result, the antenna of the communication apparatus and the antenna of the external device can be positioned accurately using the corrected reference image. Further, the position correction information is received from the communication apparatus, and the position correction information stored in the reference image storage unit is updated to the received position correction information. As a result, the position correction information indicating the corrected position of the reference image can be obtained from the communication apparatus, whereupon the position correction information can be provided to another communication apparatus.

Note that specific embodiments or examples described in the section entitled "Description of Embodiments" are employed only to clarify the technical content of the present invention, and the present invention is not to be interpreted as being narrowly defined by these specific examples alone.

Accordingly, various modifications may be implemented within the scope of the spirit of the present invention and the claims.

Industrial Applicability

The communication apparatus, communication method, communication program, server apparatus, server apparatus information updating method, and communication system according to the present invention can be put to use as a communication apparatus, a communication method, and a communication program with which an antenna of the communication apparatus and an antenna of an external device can be positioned accurately using a corrected reference image so that the communication apparatus can communicate with the external apparatus using near field wireless communication, a server apparatus connected via a network to the communication apparatus that communicates with the external apparatus using near field wireless communication, an information updating method for the server apparatus, and a communication system including the communication apparatus and the server apparatus.

The invention claimed is:

1. A communication apparatus that communicates with an external apparatus using near field wireless communication, the external apparatus having a target mark formed on a surface of the external apparatus and indicating a position where an antenna is embedded in the external apparatus, said communication apparatus comprising:
   an antenna unit that transmits and receives radio waves, required for the near field wireless communication, through a back surface of the communication apparatus, which is to be brought close to the external apparatus;
   a display unit provided on a front surface of the communication apparatus, opposite the back surface;
   a reference image acquisition unit that obtains a reference image for guiding the communication apparatus to a position in which the near field wireless communication with the external apparatus is possible on the basis of communication apparatus identification information for identifying a type of the communication apparatus;
   a reference image display control unit that displays the reference image obtained by the reference image acquisition unit on the display unit;
   a communication establishment unit that establishes the near field wireless communication between the communication apparatus and the external apparatus when the communication apparatus is moved to a position such that the reference image displayed on the display unit is close in position to the target mark formed on the external apparatus;
   an operation accepting unit that accepts an image moving operation by a user for moving the reference image on the display unit so as to align the reference image with the target mark in a case that the reference image is not aligned with the target mark when the near field wireless communication is established between the communication apparatus and the external apparatus by the communication establishment unit; and
   a reference image correction unit that moves a display position of the reference image in response to the image moving operation accepted by the operation accepting unit.

2. A communication method for communicating with an external apparatus using near field wireless communication, the external apparatus having a target mark formed on a surface of the external apparatus and indicating a position where an antenna is embedded in the external apparatus, said communication method comprising:
   a reference image acquisition step of obtaining a reference image for guiding a communication apparatus to a position in which the near field wireless communication with the external apparatus is possible on the basis of communication apparatus identification information for identifying a type of the communication apparatus;
   a reference image display control step of displaying the reference image obtained in the reference image acquisition step on a display unit provided on a front surface of the communication apparatus, which is opposite to a back surface of the communication apparatus which is to be brought close to the external apparatus;
   a communication establishment step of establishing the near field wireless communication between the communication apparatus and the external apparatus when the communication apparatus is moved to a position such that the reference image displayed on the display unit is close in position to the target mark formed on the external apparatus;
   an operation accepting step of accepting an image moving operation by a user for moving the reference image on the display unit so as to align the reference image with the target mark in a case that the reference image is not aligned with the target mark when the near field wireless communication is established between the communication apparatus and the external apparatus by the communication establishment step; and
   a reference image correction step of moving a display position of the reference image in response to the image moving operation accepted in the operation accepting step.

3. A server apparatus that transmits a program via a network to a communication apparatus that communicates with an external apparatus using near field wireless communication, the external apparatus having a target mark formed on a surface of the external apparatus and indicating a position where an antenna is embedded in the external apparatus, wherein the program causes the communication apparatus to function as a communication apparatus which:
   obtains image information including a reference image for guiding the communication apparatus to a position in which the near field wireless communication with the external apparatus is possible on the basis of communication apparatus identification information for identifying a type of the communication apparatus;
   displays the reference image on a display unit of the communication apparatus;
   establishes the near field wireless communication between the communication apparatus and the external apparatus when the communication apparatus is moved to a position such that the reference image displayed on the display unit is close in position to the target mark formed the external apparatus;
   accepts an image moving operation by a user for moving the reference image on the display unit so as to align the reference image with the target mark in a case that the reference image is not aligned with the target mark when the near field wireless communication is established between the communication apparatus and the external apparatus; and
   moves a display position of the reference image in response to the image moving operation.

4. The server apparatus according to claim 3, wherein the program further causes the communication apparatus to function as a communication apparatus which:
   creates first correction information indicating the moved display position of the reference image; and stores the created first correction information in association with the reference image.

5. The server apparatus according to claim 3, wherein the program further causes the communication apparatus to function as a communication apparatus which:
   creates first correction information indicating the moved display position of the reference image; and
   transmits the created first correction information.

6. The server apparatus according to claim 3, wherein the program further causes the communication apparatus to function as a communication apparatus which displays the reference image in a display position indicated by second correction information, which is included in the image information and indicates the display position of the reference image.

7. The server apparatus according to claim 3, wherein the program further causes the communication apparatus to function as a communication apparatus which obtains image information including a reference image defined on the basis of the communication apparatus identification information and external apparatus identification information for identifying the external apparatus.

8. The server apparatus according to claim 4, wherein the program further causes the communication apparatus to function as a communication apparatus which:
   creates a plurality of the first correction information; and
   averages the created plurality of the first correction information.

9. The server apparatus according to claim 3, wherein the program further causes the communication apparatus to function as a communication apparatus which:
   images the external apparatus using an imaging unit provided in the communication apparatus;
   identifies the external apparatus in a captured image; and
   superimposes a marker image indicating a position of an antenna unit provided in the external apparatus to transmit and receive radio waves required for the near field wireless communication onto an image of the external apparatus identified within the captured image.

10. A server apparatus connected via a network to a communication apparatus that communicates with an external apparatus using near field wireless communication, the external apparatus having a target mark formed on a surface of the external apparatus and indicating a position where an antenna is embedded in the external apparatus, said server apparatus comprising:
    a reference image storage unit that stores, in association, communication apparatus identification information for identifying a type of the communication apparatus, a reference image for guiding the communication apparatus to a display position in which the near field wireless communication with the external apparatus is possible, and position correction information indicating a moved position of the reference image;
    a communication apparatus identification information reception unit that receives the communication apparatus identification information from the communication apparatus;
    a reference image transmission unit that selects the reference image from the reference image storage unit based on the communication apparatus identification information received by the communication apparatus identification information reception unit, and transmits the selected reference image to the communication apparatus;
    a position correction information receiving unit that receives the position correction information from the communication apparatus, the position correction information indicating a display position of the reference image moved in response to an image moving operation accepted by a user for moving the reference image on a display screen so as to align the reference image with the target mark formed on the external apparatus, in a case that the reference image is not aligned with the target mark when the near field wireless communication is established between the communication apparatus and the external apparatus; and
    an update unit that updates the position correction information stored in the reference image storage unit to the received position correction information.

11. The server apparatus according to claim 10, wherein the position correction information reception unit receives a plurality of the position correction information corresponding to the communication apparatus identification information,
    further comprising an averaging unit that averages the plurality of the position correction information corresponding to the communication apparatus identification information received by the position correction information reception unit.

12. A communication method executed by a server apparatus that is connected via a network to a communication apparatus that communicates with an external apparatus using near field wireless communication, the external apparatus having a target mark formed on a surface of the external apparatus and indicating a position where an antenna is embedded in the external apparatus, the communication method comprising the steps of:
    receiving communication apparatus identification information for identifying a type of the communication apparatus from the communication apparatus;
    transmitting a reference image for guiding the communication apparatus to a position in which the near field wireless communication with the external apparatus is possible, the reference image being stored in a storage unit in association with the received communication apparatus identification information, to the communication apparatus;
    receiving first correction information from the communication apparatus, the first correction information indicating a display position of the reference image moved in response to an image moving operation accepted by a user for moving the reference image on a display screen so as to align the reference image with the target mark formed on the external apparatus, in a case that the reference image is not aligned with the target mark when the near field wireless communication is established between the communication apparatus and the external apparatus; and
    updating, on the basis of the received first correction information, second correction information that indicates the moved position of the reference image and is stored in the storage unit in association with the received communication apparatus identification information.

13. The communication method according to claim 12, further comprising the step of transmitting the second correction information stored in association with the received communication apparatus identification information to the communication apparatus.

14. The communication method according to claim 12, further comprising the steps of:
    receiving external apparatus identification information for identifying the external apparatus from the communication apparatus; and transmitting the reference image stored in association with the received communication apparatus identification information to the communication apparatus on the basis of the received external apparatus identification information.

15. A communication system comprising a communication apparatus that communicates with an external apparatus using near field wireless communication, and a server apparatus connected to the communication apparatus via a network, the external apparatus having a target mark formed on a surface of the external apparatus and indicating a position where an antenna is embedded in the external apparatus, wherein the communication apparatus comprises:

an antenna unit that transmits and receives radio waves, required for the near field wireless communication, through a back surface of the communication apparatus, which is to be brought close to the external apparatus;

a display unit provided on a front surface of the communication apparatus, opposite the back surface;

a reference image acquisition unit that obtains a reference image for guiding the communication apparatus to a position in which the near field wireless communication with the external apparatus is possible on the basis of communication apparatus identification information for identifying a type of the communication apparatus;

a reference image display control unit that displays the reference image obtained by the reference image acquisition unit on the display unit;

a communication establishment unit that establishes the near field wireless communication between the communication apparatus and the external apparatus when the communication apparatus is moved to a position such that the reference image displayed on the display unit is close in position to the target mark formed on the external apparatus;

an operation accepting unit that accepts an image moving operation by a user for moving the reference image on the display unit so as to align the reference image with the target mark in a case that the reference image is not aligned with the target mark when the near field wireless communication is established between the communication apparatus and the external apparatus by the communication establishment unit; and a reference image correction unit that moves a display position of the reference image in response to the image moving operation accepted by the operation accepting unit, and the server apparatus comprises:

a reference image storage unit that stores, in association, the communication apparatus identification information for identifying the type of the communication apparatus, the reference image for guiding the communication apparatus to the display position in which the near field wireless communication with the external apparatus is possible, and position correction information indicating the moved position of the reference image;

a communication apparatus identification information reception unit that receives the communication apparatus identification information from the communication apparatus;

a reference image transmission unit that selects the reference image from the reference image storage unit on the basis of the communication apparatus identification information received by the communication apparatus identification information reception unit, and transmits the selected reference image to the communication apparatus; and a position correction information reception unit that receives the position correction information from the communication apparatus, and updates the position correction information stored in the reference image storage unit to the received position correction information.

* * * * *